United States Patent
Geoghegan et al.

(10) Patent No.: US 7,328,166 B1
(45) Date of Patent: Feb. 5, 2008

(54) GLOBAL RESERVATIONS TRANSACTION MANAGEMENT SYSTEM AND METHOD

(75) Inventors: William Geoghegan, Las Vegas, NV (US); Eric Reed, Denver, CO (US); Craig Hendrickson, Las Vegas, NV (US); Sally Payze, Silver Spring, MD (US); Cheryl Gray, Wheatridge, CO (US)

(73) Assignee: Sabre, Inc., Southlake, TX (US)

( * ) Notice: Subject to any disclaimer, the term of this patent is extended or adjusted under 35 U.S.C. 154(b) by 0 days.

(21) Appl. No.: 09/487,361

(22) Filed: Jan. 19, 2000

Related U.S. Application Data

(60) Provisional application No. 60/118,665, filed on Jan. 20, 1999.

(51) Int. Cl.
*G06Q 10/00* (2006.01)
*G06F 7/00* (2006.01)

(52) U.S. Cl. .............................................. 705/5; 707/3
(58) Field of Classification Search ................ 705/5, 705/6
See application file for complete search history.

(56) References Cited

U.S. PATENT DOCUMENTS

| | | | |
|---|---|---|---|
| 3,656,113 A * | 4/1972 | Lince | 340/825.28 |
| 4,775,936 A * | 10/1988 | Jung | 705/5 |
| 5,311,425 A | 5/1994 | Inada | |
| 5,404,291 A * | 4/1995 | Kerr et al. | 235/385 |
| 5,581,461 A * | 12/1996 | Coll et al. | 705/28 |
| 5,732,398 A * | 3/1998 | Tagawa | 705/26 |
| 5,832,452 A * | 11/1998 | Schneider et al. | 705/5 |
| 5,918,209 A * | 6/1999 | Campbell et al. | 705/10 |
| 6,085,164 A * | 7/2000 | Smith et al. | 705/5 |
| 6,263,315 B1 * | 7/2001 | Talluri | 705/10 |
| 6,418,413 B2 | 7/2002 | DeMarcken et al. | |
| 2003/0028452 A1 | 2/2003 | Whitney, III | |

OTHER PUBLICATIONS

"Red Roof Inns Implements High-Tech Revenue Management System," Jun. 2, 1998, PR Newswire, 1 page.□□*

(Continued)

*Primary Examiner*—C. Luke Gilligan
*Assistant Examiner*—Rachel L. Porter
(74) *Attorney, Agent, or Firm*—Alston & Bird LLP

(57) ABSTRACT

A reservation system and methodology ensures that all changes to a database in a federation are reliably and immediately communicated to all of the other databases in the federation. The system communicates information concerning hotel reservation transactions. The system comprises multiple applications each associated with one or more databases including hotel reservation data. The databases in the federation reflect transactions that are communicated to other databases and they also employ information received from other databases in determining the transactions that their associated local applications permit and the way in which they are processed. In one embodiment of the invention, communication among databases occurs through the Internet and data storage devices via secure packetized messages addressed to objects that represent the relevant databases. The system of the present invention also preferably includes a central database that functions as the primary source for verifying reservations and hotel data. Additionally, the system of the present invention also includes a yield subsystem that allows hotels to increase revenues. The yield subsystem calculates rates and availability based upon forecasted changes in supply and customer segment demand.

33 Claims, 4 Drawing Sheets

OTHER PUBLICATIONS

Dina Long, "Hyatt Targets Higher Biz Travel Yields," May 2, 1994, Business Travel News, p. 1.*

"Too Many Rooms At the Inns," Dec. 28, 1992, Travel Agent, p. 77.*

Hanks, Richard D.; Cross, Robert G. Noland, R. Paul, "Discounting in the Hotel Industry: A New Approach" Feb. 1992, Cornell Hotel and Restaurant Administration Quarterly, vol. 33, No. 1, pp. 15-23.*

* cited by examiner

GLOBAL RESERVATIONS TRANSACTION MANAGEMENT SYSTEM AND METHOD

CROSS REFERENCE TO RELATED APPLICATIONS

This application claims priority from U.S. Provisional Application Ser. No. 60/118,665, filed Jan. 20, 1999.

FIELD OF THE INVENTION

This invention relates generally to transaction management and control. More particularly, this invention relates to systems and methods for processing transactions that affect inventories of products and services.

BACKGROUND OF THE INVENTION

Some industries have made great strides in adopting today's technology to provide the access and availability needed for these industries to operate in a cost-effective and otherwise efficient manner. However, achieving these goals is often difficult or impossible for a number of reasons. For example, many industries have evolved over time both with respect to the way the companies comprising the industry do business and with respect to the technology used within the industry. Because of this, there may be a heterogeneous mix of computer platforms and software in use within the industry and within individual companies.

Additionally, technology limitations and/or existing business practices may result in less than satisfactory results with respect to data access. In some cases, new data and/or data updates made by one company may not be available to other companies in the industry until after a substantial lag period. The same effect may also be found with respect to data which must propagate through a single organization or through a small number of organizations. This lag may be due to various causes including, bandwidth limitations, business practices, the need for human intervention and/or network failures. As a result of these deficiencies in propagating data, some parties may wind up working with incomplete and/or outdated data. In many cases, this can result in conflicts which must be manually resolved after the discrepancy has been discovered. Indeed, some conflicts which result from propagation delays may be unresolvable.

Another hurdle in connection with implementing a multi-organizational transaction system with satisfactory data access is the fact that the many different organizations which access the system often use incompatible hardware, software and communications protocols. Because of this lack of standardization, it is difficult if not impossible to coordinate an arrangement between all parties involved whereby compatibility is achieved.

One particular industry in which data access and availability is critically important is the hospitality industry. This industry is highly data intensive and highly data dependent in that all sorts of data including, for example, inventories, rates, property information, room characteristics, stay controls and reservations must be constantly input, updated and made available to a large number of parties with differing characteristics. The hospitality industry, in its present form, presents unique difficulties with respect to data availability and access. One such difficulty results from the fact that so many classes of users must have or desire access to information. By way of example, user classes include consumers, travel agents, consolidators, local hotel staff, corporate hotel staff and system administrators. Each of these user types accesses hospitality information for different purposes, through different hardware, and using various application software.

For example, a consumer desiring to access hotel information and/or make a hotel reservation may access hotel room availability and make reservations through the Internet employing a personal computer with a browser application. On the other hand, if the same consumer employed a travel agent to make the reservation on his or her behalf, the travel agent would typically employ a dedicated terminal with a direct connection to a "Global Distribution System" (GDS) which would in turn communicate (possibly through intermediate processing systems) with a central reservations office (CRO) processing system.

Unfortunately, with the exception of some chains, the various databases containing the collective reservations data are not currently synchronized to the extent necessary to provide consistent results in a real-time environment. As a result, if both the travel agent and consumer mentioned above both attempted to book the last remaining room in a particular hotel for a particular day, each user's system may indicate availability and permit both parties to reserve the same room. Because of this and other potential pitfalls, industry practices which are not the most desirable have been necessitated. By way of example, in order to prevent double booking, hotels may "allocate" portions of its inventory to multiple parties for booking. This is not the most desirable situation since it is possible that one booking agent may book few or no rooms while another booking agent may exhaust its supply very quickly. The current model does not allow for the automated reallocation of inventory from, for example, the relatively inactive booking agent to the active booking agent. As a result, inventory may go unused and potential customers may be turned away.

The lack of immediate and reliable communication between and among all users concerning events affecting the availability and pricing of inventory at hotel properties has been and continues to be a pressing problem preventing efficient and reliable processing of reservations. Further, the evolution of the hospitality industry has resulted in the random absorption of various GDSs, property management systems (PMSs) and central reservation systems which have been built from different platforms and generations of software technology. As a result, multiple databases, hardware and software applications from different developers and manufacturers are loosely coupled in an attempt to permit some degree of automated coordination between and among various industry players and the consumers of their products and services.

Unfortunately, the current coordination effort falls short of an effective solution for various reasons. Redundant data representing the same inventory and reservations information is stored in multiple locations. Since all databases in the system are critically dependent upon the others, it is desirable (and often crucial) to ensure that changes made to one database are reflected as soon as possible in all other system databases in order that optimum quotations of availability and pricing information can be continuously and reliably communicated to all users of all databases in the system.

Reliable, automated mechanisms to immediately communicate changes to all affected databases do not generally exist in the vast majority of systems within the hospitality industry. Instead, it is often necessary for human intervention to communicate changes to inventory, reservations and other information from database to database. As one would expect, this introduces time delays, inaccuracies, errors and clerical work presenting a less than ideal situation.

SUMMARY OF THE INVENTION

It is a primary object of the present invention to overcome the limitations of the prior art.

It is an additional object of the present invention to provide a system and method that enables one view of hospitality industry inventory data as well as other data necessary or desirable in the industry.

It is a still further object of the present invention to provide a system and method that allows real-time access to hospitality industry inventory data through a variety of access points and through a variety of access platforms.

It is another object of the present invention to provide a system and method that notifies all of the databases in a federation of databases of a change to any one of the databases in the federation on an automated and real-time basis.

These and other objects of the invention are achieved through a reservation system and methodology that ensures that all changes to a database in a federation are reliably and immediately communicated to all of the other databases in the federation. The system communicates information concerning hotel reservation transactions. The system comprises multiple applications each associated with one or more databases including hotel reservation data. The databases forming the database federation act as both producers and consumers of reservation data in that they themselves reflect transactions that are communicated to other databases and they also employ information received from other databases in determining the transactions that their associated local applications permit and the way in which they are processed.

In one embodiment of the invention, communication among databases occurs through the Internet and data storage devices via secure packetized messages addressed to objects that represent the relevant databases. The system of the present invention also preferably includes a central database that functions as the primary source for verifying reservations and hotel data. Additionally, the system of the present invention also includes a yield subsystem that allows hotels to increase revenues. The yield subsystem calculates rates and availability based upon forecasted changes in supply and customer segment demand.

DETAILED DESCRIPTION OF THE PREFERRED EMBODIMENTS

I. General Description of GRTMS

Figure 1:
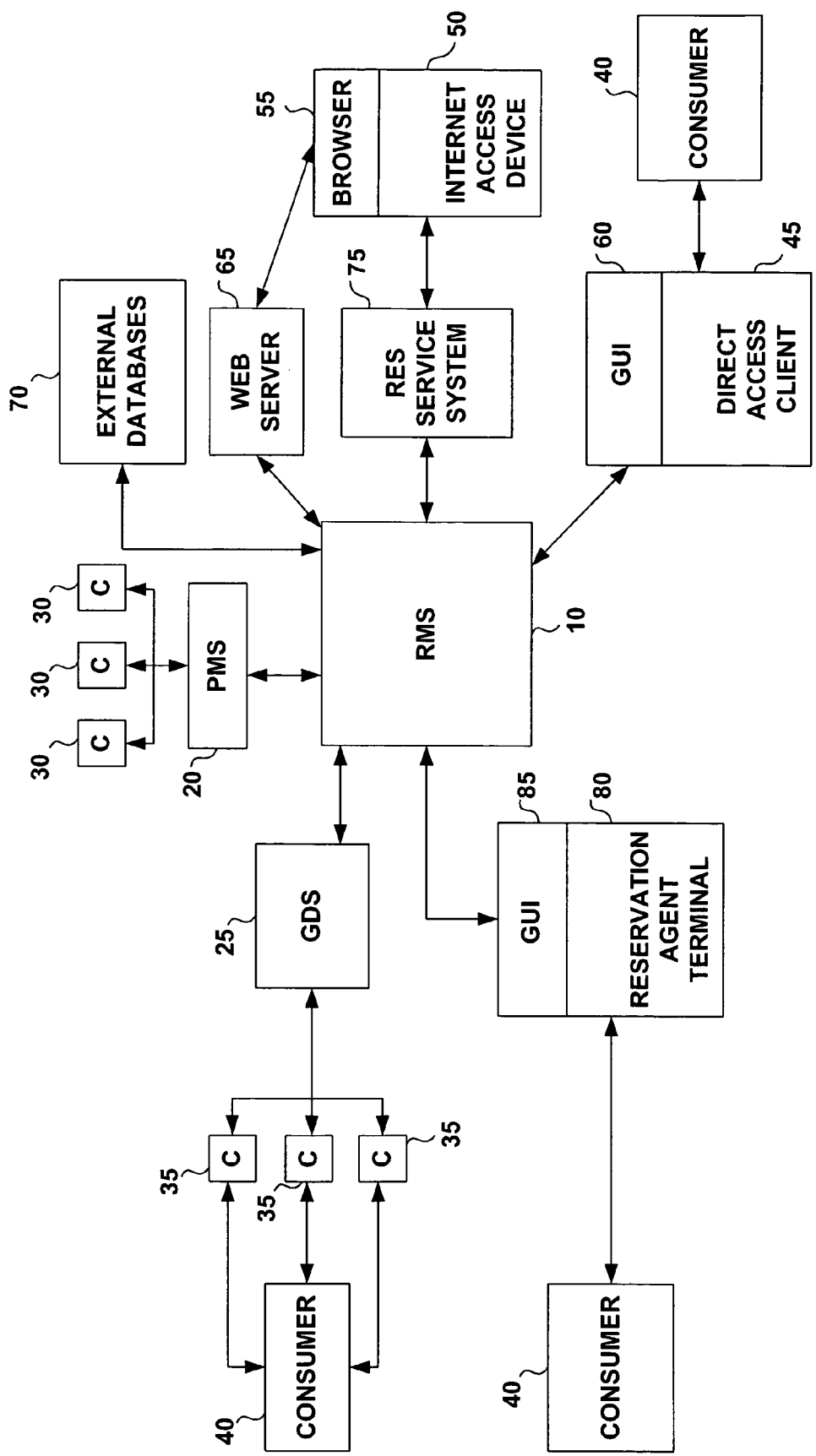
FIG. 1 is a high level block diagram of the major components comprising the Global Reservations Transaction Management System (GRTMS) of the present invention.

The GRTMS is designed to address the fundamental industry need for a single, real-time image of a property's inventory accessible by all booking sources. Without such a system, a truly effective yield management program will be difficult to implement.

The GRTMS is for the first time within the reach of the hospitality industry due to the emergence of two enabling technologies: object-oriented software development technology (object technology), and packet-switched network computing technology (network computing, including the World Wide Web). The confluence of these two technologies enables software professionals to build high-fidelity models of businesses in software, and to open these software models for electronic business from all corners using industry-accepted standards for communications, and using communications infrastructure so readily available that it has become a commodity. Software objects communicating over the Internet, representing different businesses, are analogous to human agents of different affiliations communicating by phone and fax.

The lack of immediate and reliable communication to all concerned parties of events affecting the availability and pricing of inventory at a property contributes significantly to the hospitality industry's pressing need for solutions that provide one view of inventory. Over the history of its random absorption of various global distribution systems, property management systems, and central reservation systems, built from different generations of computer and software technology, the hospitality industry has developed a heterogeneous federated database problem. Multiple databases from different makers are loosely federated by participating in value chains linked at the property to ever-growing constellations of available booking sources, and these databases redundantly store separate representations of inventory availability at the property. All databases in such a federation are critically dependent upon all others in the federation. Changes to any one database need to be reflected as soon as possible in all of the others in order that optimum quotations of availability and price can be continuously made to the ultimate users of each database. It is regrettable that reliable, automated mechanisms to immediately communicate changes to all affected databases do not exist for the vast majority of the systems within the industry. In fact, most communication features time-delayed phone and fax and contractual devices such as allotments.

The GRTMS changes this structure and enables one view of inventory. Fundamentally, there are two ways to achieve this objective. One can construct a scenario in which all availability queries are conditionally or ultimately delegated to a single source of availability information, or one can take steps to ensure that all changes to a database in a federation are reliably communicated to the other databases in the federation. To do the former requires modifications to the behavior of products comprising the installed base of global distribution systems, property management systems, and central reservation systems, and therefore is not realistic. The approach of the system of the present invention is based on the latter alternative.

The GRTMS carries information about hotel reservation transactions. The producers of this information are the databases in a particular federation. The consumers (guests, agents, voice agents, etc.) are the other databases in the federation. The hoteliers update their reflection of inventory availability and pricing at the indicated property. The carrier of the information is preferably the Internet, and the form of the information is preferably secure packetized messages addressed to objects representing the business's databases.

The GRTMS also includes a set of centralized databases which operate in connection with the central RMS function.

These databases are important for many reasons. First, the databases can act as the memory of a brand CRO (Central Reservation Office), and can collect a variety of information across all properties which may then be made available on a real-time basis to those properties. Second, the opportunity to design the programmer's interface to one of the databases in the federation allows the developer to write user interfaces for users accessing the system from external CROs or from the World-Wide Web without being constrained by the programmer's interfaces supplied with the pre-existing systems in the federation. The database set is preferably a GemStone object-oriented database management system. The GemStone OODBMS (Object Oriented Database Management System") from Gemstone Systems, Inc. is an active OODBMS with interfaces to the Java, Smalltalk, and C/C++ programming languages. GemStone offers excellent configurability and distributability of processing. It also includes features such as a replication facility and access via CORBA, HTTP and Java's Remote Method Invocation (RMI) and Distributed JavaBeans techniques.

To effect immediate, reliable electronic communication with the pre-existing systems in the federation, a preferred embodiment of the present invention includes Internet-accessible, ORB (Object Request Broker)-based "wrappers" that provide "facades" for the installed systems. ORBs and Design Patterns, of which "wrapper" and "facade" are examples, are both described in further detail below. Wrapping installed Property Management Systems such as the PMS's distributed by Micros-Fidelio, CLS, HIS, and Encore with Internet-accessible, ORB-based object facades preserves the customer's investment in existing systems, and yet transparently adds new capabilities, such as the ability to communicate changes to other databases in a federation. The system of the present invention preferably accommodates maximum customer configurability everywhere possible, especially in the area of database synchronization policies, by liberally employing the "strategy" pattern. The GRTMS further preferably complies with reservation synchronization standards, and other industry system standards, emerging from the HITIS and WHIS initiatives.

The GRTMS preferably includes a GemStone repository at the hub, with Web interfaces for certain booking sources, and with Internet-accessible, ORB-based facades wrapping installed systems. The breakthrough benefit provided by such architecture is the ability to transparently synchronize all databases in a federation, thereby providing one view of inventory, and thereby enabling meaningful yield management. All parties accessing the GRTMS should preferably be accessible from the Internet.

II. Major System Components

FIG. 1 illustrates the major components of the GRTMS. Reservations Management System (RMS) 10 represents the central functionality of the GRTMS in that it consists of multiple software modules which interact with other components to process reservations transactions. In one embodiment, RMS 10 may reside on a server or multiple servers such as a SUN SPARC Server farm or the like. In a preferred embodiment, RMS 10 is secure and the hardware platform provides redundancy in case of failure.

RMS 10 communicates with multiple external databases which store reservations information and transaction results. These external databases 70 include hotel data, reservations data, chain information, inventory information, rate information and the like. RMS 10 communicates with multiple Property Management Systems (PMS) 20 preferably through an Internet connection. Other communications paths are possible including dial-up access and virtual private network access. In a preferred embodiment, each hotel or each chain has a PMS system locally at the property or accessible from the property. Access is through one or more client terminals or locations 30 at the property. Alternatively, the locations 30 can represent multiple hotels in a chain that has a PMS system. The PMS systems function to control and operate local hotel management operations including, for example, the sale of rooms, financial data for the hotel and other aspects of hotel management such as housekeeping room status, etc.

PMSs 20 and RMS 10 communicate the above information between them as reservations are made and as hotel operations continue. In some cases an interface may be necessary to allow PMS 20 to communicate with RMS 10. In a preferred embodiment, the interface functions by generating HITIS compliant data. In addition to communicating with PMSs 20, RMS 10 communicates with one or more Global Distribution Systems (GDSs) 25 such as SABRE operated by the Sabre Group or a control switch company giving access to each major GDS 25. GDSs 25 provide global access to various Central Reservation Systems. In most cases, only travel agents 35 or other authorized users have access to this system and may make reservations therethrough. However, in some cases, a consumer 40, using a home PC may link through, for example, the Internet, to access the GDS 25 in order to make a reservation. The GDS 25 to RMS 10 connection may be through the Internet or through some form of dedicated line or private network.

The RMS may also interact with reservation agent terminals 80 having a graphical user interface 85 and not associated with a GDS. An example of this scenario would be a consumer 40 calling a hotel directly and making a reservation. The hotel reservation agent, using the terminal 80 can make the reservation using the RMS 10.

Other possible access scenarios include a consumer using his or her PC (Internet access device 50) running an Internet browser 55 such as Netscape Navigator or Microsoft Internet Explorer (no special browser/client software is necessary) to access RMS 10 to make a reservation. Internet access device 50 may communicate directly over the Internet with RMS 10 through a web server 65 or communication may occur through a standalone reservation service system 75.

Alternatively, a user desiring to make a reservation may access RMS 10 through a direct access client 45. The user interface 60 in this case could be "browser-like" or it may be a specially designed interface specifically intended to interface with RMS 10 for the purpose of initiating reservation transactions.

Figure 2:
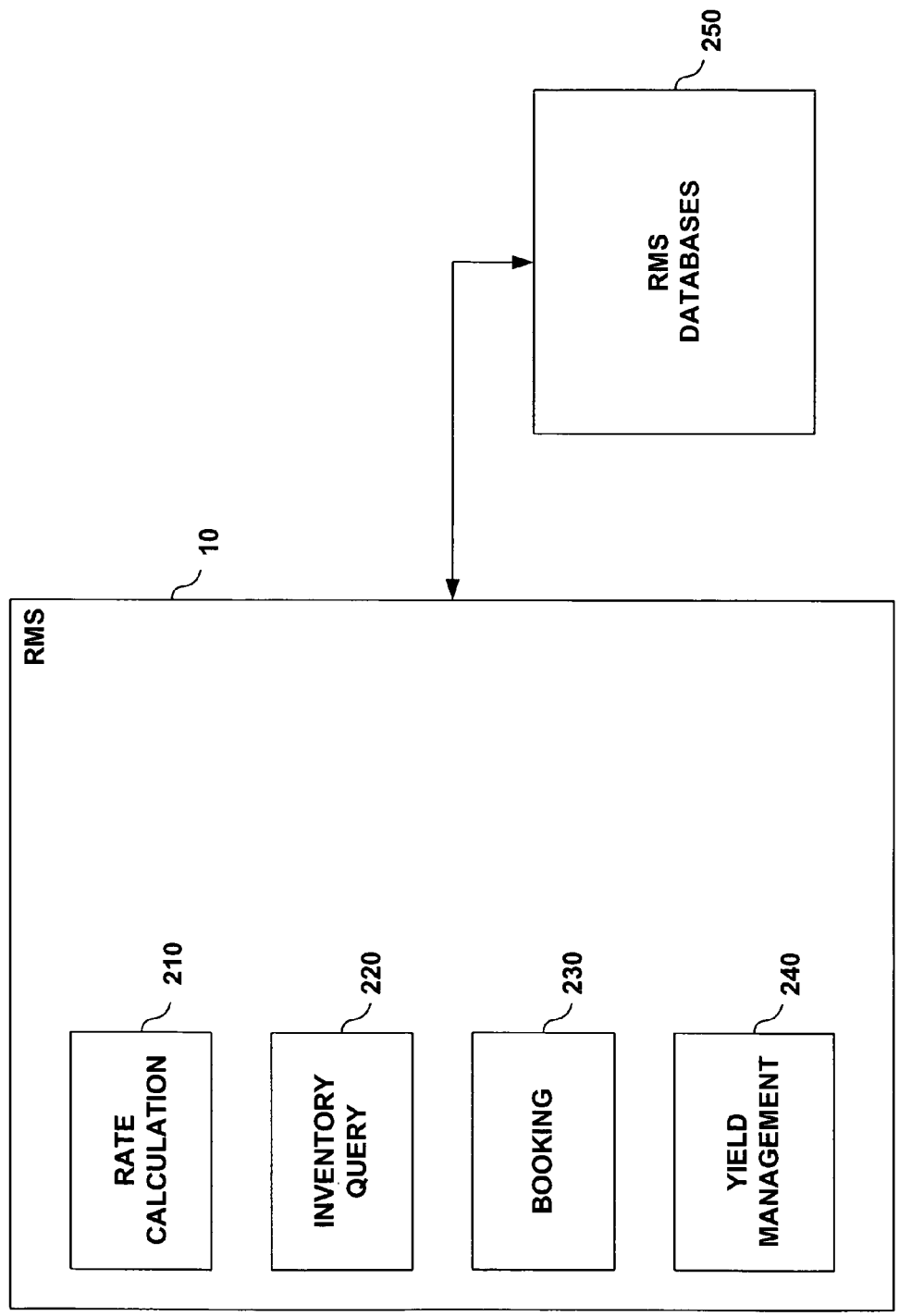
FIG. 2 is a block diagram illustrating the major components of the Reservation Management System (RMS) of the present invention.

FIG. 2 is illustrative of exemplary components of the RMS function 10. As can be seen, the RMS 10 may include functions performing the tasks of rate calculation 210, inventory query 220, booking 230 and yield management 240. More details about each of these functions follow below.

Figure 3:
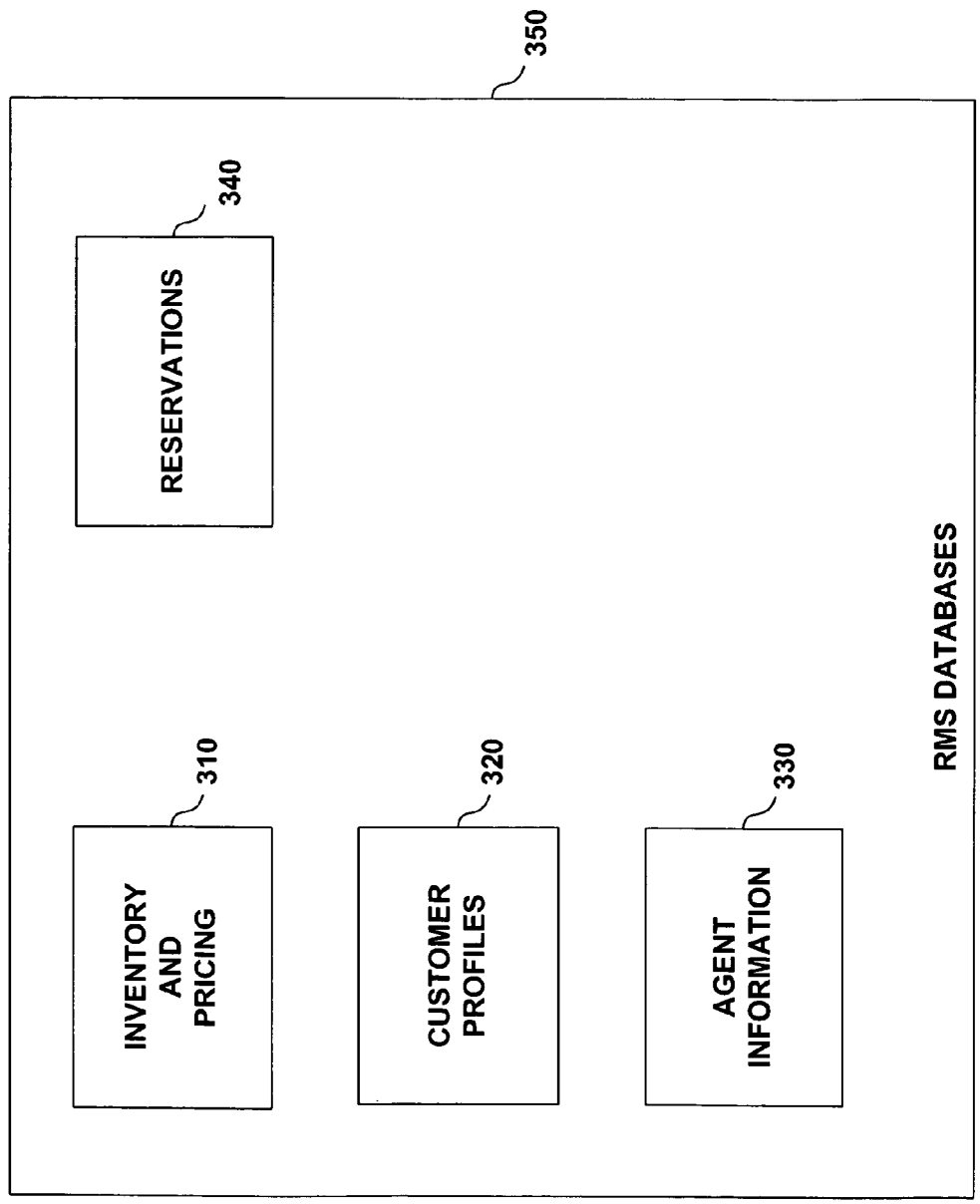
FIG. 3 is a block diagram illustrating exemplary databases that may be associated with the RMS in a preferred embodiment of the present invention.

FIG. 3 illustrates databases that may exist in connection with the GRTMS of the present invention. For example, the RMS databases 250 may include an inventory and pricing database 310, a customer profile database 320, an agent information database 330 and a reservations database 340. These databases and the way they are used is discussed in detail below. Other databases may also be added depending upon the particular implementation and operation desired.

III. Particular Advantages of the GRTMS

The GRTMS provides unprecedented advantages to hotel chains and management companies in providing services to the hotel property owners. These advantages include:

1) Reintermediation of the Distribution Channel with Direct Connection to GDS, Travel Agents, and Consumers The system of the present invention preferably provides for direct connection of inventory availability to Internet and Global Distribution Systems. Hotels may reduce their dependence upon representation company reservation systems that provide call center and CRO services as these may be fully performed by staff located in the hotel's reservation center. This new capability to directly book any inventory from one location provides an ability to reduce or eliminate approximately $14, or some significant percentage of revenue, per reservation which is currently being charged by representation companies. As more guests and travel agents book hotels directly over the Internet, the solution provided by the present invention will provide a further reduction of approximately $9 per reservation. Hotel chains may also be able to further reduce the burden on individual properties through central management of the approximately 50% of the reservations which are believed to be directly made with the property staff. Finally, corporate relationships with tour, visitor bureau and convention companies will be improved by an ability to provide direct (and possibly electronic) service from the corporate facilities.

2) Accurate Forecasts of Micromarket Demand

By creating a single-view of inventory, hotels can utilize state-of-the-art solutions for calculating rates and availability based upon forecasted changes in customer segment demand. Yield or revenue management has been found to offer as much as a 30% improvement in revenues by focusing on selling to the right customer at the right time for the right price. However, the performance of these systems is critically dependent upon available and updated historical data, and their impact on profitability is not always the same as on revenue. By fully knowing history for bookings and guest profiles throughout the chain, hotels can more accurately predict the quantity of room nights in demand by each type of guest (segmented by their willingness to pay a higher or lower price for a room). With this knowledge, rates may be set to ensure optimum occupancy rates while also ensuring the achievement of the highest revenue per guest (yield). Furthermore, it is possible to further enhance forecasts by including on demand industry data by customer segment and geographic territory—how many, and what type of, people travel to a location on a particular date based on bookings of airlines or hotels of a particular type.

3) Protection of Investments

All of the advantages discussed in this section would be less likely to be realized if it was necessary to substantially replace existing systems. The system of the present invention utilizes novel techniques that enable, for the first time, the inclusion of existing and planned investments in property management and reservation systems. The GRTMS enables hotels to evolve their systems at a rate that meets their budgetary requirements. Furthermore, by utilizing a transaction-pricing model for these products, the GRTMS assures hotels that future technology costs will be more related to the occupancy and profits of the Company.

4) Customer Retention

A centralized inventory repository coupled with guest history information can be used to improve customer loyalty. A single-view inventory system can first allow a guest to use whatever booking source is most convenient and be assured of obtaining the same pricing and availability as from any other. Secondly, knowledge of customer history that has been collected at any hotel property can be instantly available centrally to modify yield driven availability and pricing when the customer is identified.

IV. Preferred Implementation of the GRTMS

The GRTMS replaces the reservation function within the hotel's Property Management System with a network hosted reservation service. In cases where a Property Management System does not exist, the GRTMS provides an economical, stand-alone reservation management process for the hotel. A unique aspect of the GRTMS is that the system may be marketed not just to individual lodging properties (including bed-and-breakfasts and condos), but also to lodging groups and management companies and, eventually, across large lodging chains. The business model is based on the operator of the system receiving transactional revenue associated with each realized hotel stay.

The foundation of the GRTMS is a centralized data facility in which all availability and pricing is located. Therefore, all transactions within the system that affect availability are processed through the GRTMS. This preferably includes walk-in guests, as well as those who change the duration or room type of a previously reserved stay. For marketing purposes, the system administrator may price its transactions to coincide only with a guest stay. Cancellations and no-shows can be set up to be free from charges. From the perspective of the hotel, this means that it will only pay a fee if the hotel receives a guest stay (not current reservation system practice). From the system operator's point of view this is immaterial because the average percentage of cancellations is less than 5%. In the case of a no-show, where the hotel charges the guest for the room, the system operator will receive a transaction fee.

V. Functional Capabilities of the GRTMS

The GRTMS functional capabilities for individual, multiple, itinerary group, and automatic reservations are next described. The functional capabilities for the following reservation-related activities are also described: confirmations, retrievals, adjustments, cancellations, change history, wrapup, turnaway, brochure requests, deposits, waitlisting, and scripting. In addition to the capabilities discussed below, additional capabilities may be added as would be obvious to one of ordinary skill in the art.

Individual Reservations

An individual reservation is the typical reservation taken by a Voice Agent for a single stay. Any Voice Agent at a hotel or the CRO may book (add a new), adjust (change), cancel (but not delete) an individual reservation for any valid and available hotel in the chain. The reservation information may subsequently be transmitted to the chosen hotel in a timely manner. In addition, the reservation data may, at the request of the party, be transmitted to the guest or the guest's agent. Any Voice Agent may also shop for availability of hotels, rates, packages, etc. A Voice Agent is able to easily and quickly enter the essential information required for a reservation. A Voice Agent is able to easily and quickly search any or all appropriate files (guest, corporate, travel agent, group, offering, rate, etc.) in order to retrieve appropriate existing records for automatic insertion into a reservation.

Essential (mandatory) stay information for a temporary reservation consists of: hotel, arrive date, departure date (or number of days in stay), number of persons and number of rooms. The values of number of persons and number of rooms must be unambiguous (e.g., one cannot have 3 persons and two rooms). If the number of rooms requested is more than some maximum number set by the chain (e.g., 20), then supervisory confirmation of the number is required of the Voice Agent. The reservation may be guaranteed by any method valid for that hotel. Additional, but not mandatory, information for the reservation are: Number of adults and children. In some countries, there are taxable and tax-free adults and children.

Each reservation may have any number of additional free-form comment fields. Comment fields may be entered during the reservation process, entered at a later time as an adjustment, or automatically generated from guest history comments.

A "Pseudo name" or "temporary name" may be initially entered to be later replaced with the real name of the guest. For instance, if a secretary calls to reserve rooms for employees of the company, but does not yet know who actually will be making the trip. In this case, no guest history data will be required for entry or generated as a consequence.

If the chain and hotel is configured for member or club Id numbers, then additional search by this value is allowed. After the guest is retrieved, guest profile and history can optionally be displayed. The Guest Profile may indicate blacklist or cashlist. Blacklist requires special authorization in order to complete the reservation, whereas cashlist does not. Special authority is required to toggle these flags. Voice Agent can modify an existing Guest Profile, but new numbers cannot be entered by the Voice Agent.

After the company or Travel Agent ID is entered, then relevant information is displayed and defaults are loaded.

At any time after a hotel is chosen and at any point in the rest of the program, the Voice Agent is able to retrieve and review several pages of specific hotel information text.

After reviewing the information text, the Voice Agent is returned to the exact prior location and context in the program.

At any time, a "mini-menu" list of choices may be invoked by the Voice Agent via a dedicated function key or otherwise. The typical choices available through mini-menu include: 1) program restart after functions such as: abandon (no booking), select another hotel, make a reservation, and brochure request; 2) return to exact context after functions such as: frequent guest inquiry, currency conversion, reservation and cancellation policies for selecting another hotel and hotel inquiries; and 3) ask agent whether to start over after functions such as a brochure request.

At any time, the Voice Agent has a "duplication last" and "duplicate all in window" function that copies the data from the prior session into the current field or fields. The Voice Agent has the ability to traverse from window to window at their discretion. Before confirming and concluding a reservation, all mandatory data fields are checked for completeness and correctness. Most data is validated, as appropriate, at the time of entry of that field. On essentially all windows, the current reservation header information (hotel, dates, guest name, etc.) is recapped at the top of the screen.

The Voice Agent is able to look up any of the chain's hotels by: specific hotel code (chain or GDS), geographic location, landmark or local attraction, and/or other keyword as may be determined by the chain. With respect to landmark or attractions, a distance from the hotel is preferably calculated and displayed based on latitude and longitude that have been entered in the database.

Either a partial or complete entry may be made. Once the hotel is chosen, the hotel's important selling features and address are made available for display. If the Voice Agent or prospective guest rejects this hotel, then the Voice Agent is able to quickly return to the "location" selection and the hotel window is cleared of all data.

The default arrival date (0 or blank) is preferably today's system date. A numeric entry less than 100 will be interpreted to mean the relative number of days from today. An entry earlier than today (or less than zero relative) is not allowed. A wide variety of input formats including European are supported. In all cases, the echo display format is fixed by the chain. All date fields in the program preferably act similarly to this, however, relative dates may be optional.

At any time, if the chain desires, a multi-week availability calendar may be displayed. This display provides the Voice Agent with high level information about the current availability status of the hotel. In other cases, a boolean return value (Y/N) will be displayed.

If availability information dictates that the hotel is closed to arrivals on this date, then the Voice Agent is so notified and asked if another date is desired. The Voice Agent is then permitted to enter another date or hotel. If no other date is desired, then capture the denial and restart.

The default departure date is at least one day after the arrival date. A numeric entry less than 100 represents the days of stay. Input and output formats the same as arrival day. Days of stay can not be more than a maximum number of stay days set by chain or hotel policy. Under no conditions of Voice Agent field traversal can the relationship between arrival and departure dates be violated.

After the departure date is entered, the span of the stay is highlighted on the availability calendar display. All other restrictions are then checked for the stay span (such as minimum, maximum number of days, etc.) and the Voice Agent is advised if there are any violations.

The number of rooms is greater than zero (0) and less than a maximum (e.g., 10) set by hotel or chain policy. If the number of rooms is zero, then restart the program (this is a convenience for the Voice Agent). If there is an allotment of rooms (inventory) specified for the arrive day, the system ensures that the number of rooms requested does not exceed the allotment. The chain or hotel must specify how the GRTMS should handle these situations. GRTMS does NOT sell to the last room, i.e., the allotment is not locked for this reservation until the reservation is confirmed; overbooking in this situation is allowed.

The number of adults is greater than zero (0) and less than a maximum (e.g., 10) set by hotel or chain policy. If the number of adults is zero, then the program is restarted (this is a convenience for the Voice Agent). If the number of adults exceeds two, then optional information (e.g., adult rollaway info, depending on the unit type) may be displayed. The number of adults is checked again during rate lookup. Rates may have a maximum adults limit. A rules table is included in the GRTMS. This table reflects rules applicable to occupancy, rates, etc. and is preferably externally maintained, not hard coded into the GRTMS.

The number of children may be zero (0) and less than a maximum (e.g., 10) set by hotel or chain policy. If there are children, child rollaway and crib information is preferably displayed. Also the minimum age for free stay (this is hotel dependent) is also preferably displayed. If over a minimum age, children are treated as adult for rate purposes.

An optional frequent guest ID may be entered in any of the following ways: by ID number entered and verified (with generic help using first part of ID number), by guest name, by a partial guest name, or by a phone number. If the frequent guest ID is valid, then relevant information is displayed and defaults are loaded. The Voice Agent may maintain existing frequent guest data for the convenience of the guest. A new frequent guest data record can be entered and edited by the Voice Agent. The maintenance window is available from the mini-menu function selection.

When assigning a confirmation or other ID number for use in the GRTMS, each number is unique and digits and letters which could be confused are not used. For example, in a preferred embodiment of the present invention, none of the following characters are used in assigned identification strings: I, L, 1, 0, O, 5, S, Z, 2, etc.

Multiple Reservations

A multiple reservation is the booking of more than one reservation during the same conversation between a guest and Voice Agent. There may be different guests, different rooms, but must be the same hotel and stay dates. A different hotel or stay dates requires a separate or itinerary reservation.

The Voice Agent is able to clone (duplicate) an existing Reservation or part thereof (usually the one just booked or one which has been recalled). Duplicated information may include guest information, hotel selection, stays, agent, corporation, or any combination thereof. This facilitates quick multiple reservations for different guests with the same stay information or the same guest with different stay information. The Voice Agent may also take an accelerated path through the booking process.

Each reservation in a multiple has a different confirmation number. However, multiple reservations must be related with a unique "multiple reservation set" number so that they may be retrieved together for adjustments.

A "Share with" reservation is a single reservation for two or more guests staying at the same hotel on the same stay dates and in the same room. There may be any number of "Share with" names. The PMS might require this, but one must be denoted as the primary guest. This is not necessary for the GRTMS. Any reservation is also retrievable by "Share with" name. Different arrival and/or departure dates for individual "Share with" guests are preferably handled by the Hotel PMS. At the time of the booking, it is possible to pre-define the billing for the reservation, i.e. whether to bill to a master folio, city ledger account, etc.

Itinerary Reservations

An itinerary reservation is the booking of more than one reservation for the same guest(s) during the same trip but at different hotels in the chain at different, but near sequential dates (may have gaps because the routing includes a city without a chain hotel, stay with family, etc.).

The Voice Agent is able to clone (duplicate) the last reservation in the itinerary or another one previously booked. This facilitates the quick entry of itinerary reservations for the same guest during the same trip. Itinerary reservations for the same guest are related so that they may be retrieved together for adjustments. A "Travel With" can be another linked association between two or more reservations.

Group Reservation

A group is usually five or more guests occupying ten or more rooms who have some common characteristics: they are all from the same company or organization and are all arriving on approximately the same dates. The group reservation may be created by either the destination hotel (primarily) or the GRTMS (if necessary). The originating location becomes the creating authority for this group reservation. Only an authorized operator (typically at least a supervisor at a hotel) at the location may create a group reservation. Subsequently, only the creating authority may then alter (change or cancel) the group reservation. Any master billing information is automatically be added to the reservation. A request for a tentative group reservation may be transmitted from the GRTMS to the specific hotel.

A group and its primary reservation are uniquely identified by the Group Keyname which is preferably an abbreviation of the group name. The Keyname identifies the group, but there may be multiple stays for that group, therefore it is not unique to a stay.

Business information for the group includes the actual group name, group's contact (name, language, salutation, VIP code), address and telephone information, travel agent (and their commission % or code), billing contact, one line comment and multiple line remarks.

Other mandatory information for the primary group reservation include the arrival and departure dates for the group, the market segment, and reservation type. The Potential should be estimated if this is a tentative group reservation. Additional information for the group is meal plan, color, method of payment, flags and package codes. These elements will be carried over to all members of the block (picked up reservations).

The group reservation indicates the estimated total number of adults and children in the group. The Group's (usually discounted) Rate Code may be preassigned during Group Master creation or if not entered, then the default Rate Code for the company, Travel Agent or source will be used. A group block and master reservation must be created before individual reservations may be picked up for that group. This will reserve the indicated number of rooms directly of house availability.

For gathering corporate client-level statistics, an optional master account may be specified. Group statistics from GRTMS include last activity date and last rate. Group statistics from the hotel include arrivals, room nights, no shows, cancellations and revenue.

Any Voice Agent may book individual reservations for a group member. Each individual reservation will be linked with the primary group reservation. This process is called "pickup". During pickup the rooms count in the primary reservation is decremented by the corresponding quantity. During pickup the Room Type is taken from the preallocated group block. If there is insufficient availability of the requested Room Type, then it is possible to borrow enough from house availability if the HRO is configured for same. Borrowing from a Room Type does not increase the total size of a block, it only readjusts the allocation among the different Room Types. If a block is depleted, then the pickup reservation cannot be booked without an appropriate override.

The group reservation may be retrieved directly by group ID. The operator may choose a group reservation from among a list of reservations attached to a particular owner (company, tour, series, etc.). The reservation may also be retrieved by those means applicable to individual reservations.

An authorized creating authority operator must confirm cancellation of the group reservation. All associated individual reservations must either be canceled or changed. The group reservation must then be canceled and its remaining block deallocated back to house availability.

The entry of a name list or "rooming list" is a quick method for creating individual reservations for members of a group. Name lists may be entered at the destination hotel (primarily) or GRTMS (primarily) (if necessary).

The group reservation is quickly retrieved. For each name entered into the name list, a new guest name record is created and an individual reservation is booked automatically against this group's block or availability. Individual room assignments are the responsibility of the hotel PMS.

A history of the group is preferably kept. This includes the original or tentative reservation and its subsequent fulfillment. Leads on repetitive business from last year's (or other period) group stay can be sent to the appropriate HRO.

Automatic Reservations

Automatic Reservations are those booked from an external source (usually an Airline CRS) by an automatic or semi-automatic process. Type A automatic reservations are booked, modified, canceled, reinstated or rejected or rejected automatically in a timely fashion required by agreement with the external CRS. Erroneous Type A reservations are not reviewed by an operator. Rather, erroneous Type A reservations are assigned to a Type B reservation automatically if the error is not corrected.

Type B semi-automatic reservations are booked, modified, canceled, reinstated or rejected automatically. An erroneous or ambiguous reservation is reviewed by an operator and corrected or clarified. The reviewed reservation is either retried for automatic rebooking, booked manually, or not booked at all (negative confirmation is returned to the external CRS).

Reservation information fields in the external CRS GNR request must be consistent for the GRTMS booking criteria; if not, the request is rejected.

Room Types in each external CRS are mapped, to the specific Hotel's Room Types. All external CRS room types are mapped, but not all Hotel Room Types are represented in the external CRS. A Hotel Room Type and rate is selected automatically if the requested room type is available at a rate equal or below the one requested.

Guarantee and frequent flyer card codes in the external CRS are mapped to GRTMS card codes. Guarantee information must be sufficient for the rate selected.

Guest names, corporate names and travel agents are not be verified in the GRTMS database unless accompanied by the appropriate identifier (frequent guest number, corporate ID or IATA number).

If a written confirmation is required, then guest address information in the GNR is necessary and must be complete.

Confirmations

Confirmations may be sent to a guest or the guest's agent for any hotel so long as the stay arrival date is in the future. The number of days in the future is configurable by the Chain and may be customized by the hotel. The parameters of the customization include the method of confirmations (i.e. a fax or e-mail confirmation may be day of arrival, while a mailed confirmation may be 5 days.) The hotel may customize the templates for both written and faxed confirmations or may use the default for the chain. If a printed confirmation is to be mailed, then the guest address information is necessary and must be complete. The confirmation mailing address may be different than the guest profile or may be the group's (if any), company's (if any), or travel agent's (if any). If the confirmation is to be faxed, then either the fax number in the guest profile must be completed or a different number may be entered. Confirmations may be batched or sent immediately based upon time to arrival, type of transmission, or operator override. Information on if, when, and how a confirmation was sent will always be available to a Voice Agent viewing the reservation record.

Retrieval

An existing reservation may be retrieved by any of the following database browse lookups. The methods of retrieval are in preferred order: 1) confirmation number (most guests seem to know theirs) including guest last name plus arrival date plus hotel, frequent guest ID, company affiliated (corporate) ID plus guest last name; 2) group/convention ID plus guest last name; and/or 3) travel agent plus guest last name including credit card number and/or telephone number. Once a reservation is selected, the reservation and related records are retrieved and displayed to the Voice Agent. Given the full display, the Voice Agent is asked to confirm that this is the correct record.

Adjustments

A previously booked reservation may be adjusted. If the data changed affects availability (stay dates, hotel, etc.), then the original reservation must be retained (including its inventory) until the adjustment is completed. At that time, the inventory associated with the original inventory may be released. If the guest is changed then the relevant guest statistics must be adjusted (backed out of original guest and applied to new guest). If the hotel is changed, then adjustment is effected by canceling the existing reservation and creating a new reservation. This is done automatically by the GRTMS, but the guest must be advised of both the cancellation number and new confirmation number.

Cancellations

A canceled manual reservation can be reinstated up to the arrival date. A canceled automatic reservation cannot be reinstated, but must be rerequested. A canceled reservation must return its inventory to Hotel availability or to the Block (group, T/A, etc.) as appropriate. This may result in a reopen of a previous closeout. Cancel reasons can be picklisted in arbitrary sequence. Tentative reservations can be mass canceled.

Change History

Whenever a booked reservation is created, any part is adjusted or the reservation is canceled, this is logged in an audit file. For adjustments, at least the delta (before and after) difference is kept, although a snapshot of the 'before' data is acceptable. As a minimum, the Voice Agent (or process, if an automatic reservation) and the timestamp when the adjustment was updated is captured. The agent is able to display the change history and comments related to each transaction concerning that reservation.

Wrapup

Wrapup is the capture at the end of every voice call of the result of that call. If the call was converted to a booking, then the wrapup occurs automatically (transparent to the Voice Agent). If the call was not converted to a booking then the Voice Agent must select one of the predefined reasons for the negative result. The selection is derived from a list of possibilities which begins with intuitive assumptions based on the last process prior to the abandon. For example, if the last process was the price display, it should be assumed that price resistance was the reason for failure. The dialog box then checks price resistance, but allows the agent to change the reason. The Voice Agent may also enter free form text comments to further clarify the situation.

Turnaway

A turnaway is a lost booking that occurs when there was a guest request for some booking combination that was not available at that moment. Turnaways are automatically captured every time this occurs and the information reflects the particulars of the situation. This data is captured for purposes of the yield management system discussed below. Amongst the turnaway situational information are the requested stay dates, the number of rooms, the hotel, and the price tier requested. If the turnaway happens to a Voice Agent, then the time elapsed during the call and the point-of-abandon in the process is also captured.

Brochure Requests

The operator may enter brochure requests for later delivery. Brochures may be requested from any point in the reservation booking process. If the address is already entered, it will not have to be re-entered. A brochure request generated by any hotel may be delivered from CRO or the requested hotel.

Deposits

Deposits are one of the guarantee methods that can apply to a reservation. The Voice Agent has access to the specific deposit requirements for the particular circumstances (these pop up as required). These include: deposit amount, intermediate payment amount, final due date, refund policy, partial payments, cancellation penalties, payment data, and amount due (as a read only field).

Guarantee and cancellation policies are controlled by the individual properties from a corporate-wide super set of policies. The policies are season (date span) specific and may be amenity or unit type specific. There may be more than one policy in effect during a stay. Policies also have priorities, meaning that if two policies are in conflict, the one will outweigh the other. Policies are displayed at various times during the reservation session to assure that this information may be communicated to the guest. In addition the Voice Agent may display these policies at any time via the mini-menu function. The policies may affect an individual booking. Typical guarantee methods are: 6 PM or 4 PM Release (i.e., not guaranteed), guaranteed by credit card, guaranteed by company (i.e., direct billed), and guaranteed by deposit.

The GRTMS is capable of managing deposits taken in advance for any Hotel. This includes receiving the deposit and crediting it to the specific reservation. This information is auditable. Reservations for which a deposit is past due and no deposit has been received are automatically cancelable. The policy for canceling reservations with partially received deposits may vary by hotel.

Waitlist

A non-confirmed reservation may be entered for a guest even though currently there is no availability (including overbooking). The reservation will be put on Waitlist. A waitlisted reservation may be manually changed to a current reservation if the availability is sufficient at that time. All waitlisted reservations are pruned two days after the requested departure date. Waitlisted reservations may be listed and/or reported for resolution by priority such as by date requested, rate requested, guest type or company other. Waitlisted reservations may not be automatically changed to current without specific confirmation from the requester.

Scripting

The GRTMS provides both optional and mandatory scripts (text for the Voice Agent to read to the guest). The scripts may be free form text or fill-in-the-blank that includes certain data from that session. These scripts are available at the option of the Voice Agent (as suggested conversation) or forced to appear at certain places in the program (mention specific information to the guest). In either case, the script may be closed (removed from the window) after nominal input from the Voice Agent. The location of these scripts and their content is controlled administratively, not by a programmer. The scripts, their location and status (optional or mandatory) may vary by hotel.

Caller

The name of the calling party is captured early on.

Notes

Specific notes about the property (e.g. pool closed for maintenance convention information, etc.) is displayed within the reservation process at the appropriate time. A list of all notes (with headlines) which apply to the projected date range is preferably displayed in one box. An agent acknowledgment is required assuring that the notes have been reviewed and accepted by the guest. If further information about a specific note is required, the agent can execute a hyperlink and get detail about that note.

VI. Configuration and Control

The following is a description of the configuration and control of the GRTMS in a preferred embodiment. This includes system topology, chain composition, policy and operational default information for the chain. The hotel configuration defines the status of all hotels in a chain and its access and update constraints. GRTMS control information may be limited-access, externally changing or incrementing.

System Topology

The GRTMS supports operations on a variety of computers at one or more physical locations. These operational logical nodes may be located on the same or different computers. These node include one Head Quarters Office (HQO) for the company, one Central Reservations Office (CRO) for the company, and one Hotel Reservations Office for each hotel in the chain. The HQO supports one or more Hotel Chains, which the Company may or may not own. Operationally, chains must be segregated, but statistical data may be aggregated for reporting purposes. The CRO may be a different computer at a different location than the HQO. One or more hotel chains may share the resources of one CRO computer, although each chain must operate as an independent CRO. The chains may be cross-connected for booking purposes and share common semi-static operational data (IATA, etc.). The HRO is usually physically located at the hotel. The HRO is a web-capable computer.

Each operational node (HQO, CRO, or HRO) is identified by a unique code regardless of its physical location. Any GRTMS program must have an accurate means of determining the node from which it is being run, the type of user who is executing the program and which hotel's data (if any) is being accessed. This is because certain GRTMS procedures are preferably constrained to execute only with appropriate security rights.

The Hotel Chain consists of one or more hotels owned and/or operated by a headquarters. Each hotel chain is identified by a unique internal code and a full name. In addition, relevant demographic and system information about the chain is kept. The hotels in a chain may be organized into a variety of groupings for sales, marketing, booking or reporting purposes. Some of these groupings include: geographic location, geographic region, type of hotel, kind of service/rating, sales area, marketing area, common packages, common groups, affiliation status, and cross selling. Each chain may determine time sensitive informational notes to be displayed to all certain types of users, such as the relevant reservation voice agents. One Hotel Chain may cross sell to another Hotel Chain if configured for cross selling.

Company-wide policy and operational default information is kept at the HQO and can be used for hotels with the chain. Examples of this data include: language (standard for chain, region and hotel); currency (chain standard, at hotel, those supported); credit cards (where valid at, guideline limits); frequent flyer and guest cards; turnaway excuses (for non-bookings); guarantee policies and codes; time periods (accounting, etc); postal, state, province codes (official); market segment codes (general & specific); and travel agents (IATA, ARC, TIDS, ABTA, etc).

Hotel Configuration

The Hotel Configuration defines the detailed status of all hotels in the chain using GRTMS. This includes internal and external system identification and authorized operational modes. Note the difference between the Hotel Configuration and Hotel Information, which is informational only and is created and updated by the individual hotel. Each hotel supported by the system is identified by a unique internal code and its various airline codes or equivalent name abbreviation. Each hotel is associated with a Hotel Chain supported by the GRTMS. Each hotel has an affiliation status for legal and reporting purposes.

A hotel may belong to a variety of groupings for sales, marketing, booking or other reasons. These groupings are maintained by the CRO and may be accessed by appropriate user programs. Typical groupings include: local (geographic) areas features (searchable), clusters (internal distribution), comments (date sensitive, active), and notes (non-date sensitive, active).

Certain database information is maintainable directly by hotels using their HRO. For consistency and policy reasons, it is desirable to constrain the maximum and/or minimum values of certain of this data. Examples of this data are: 1) Updating rate amounts outside of approved bounds; 2) Maximum number of rooms allowed in a reservation; and 3) Longest length of stay allowed in a reservation.

The Control Information determines the operation of the GRTMS. This Control Information may only be inserted or updated by an authorized user executing a high authority access maintenance program. Read-only query into Control Information is allowed with minimal authority. However, the view of the Control Information is constrained to a subset or a specific record requested depending upon the circumstances.

The Control Information is grouped into coded categories not normally seen by the user. Within each category, the user's access to specific data record is uniquely codified. Where possible, these user-accessible codes are mnemonic. Each Control Information record contains at least a free form description of the purpose of this data record and an optional integer value.

The scope of Control Information falls into these limited-access categories: 1) global for the Company (controlled by HQO); 2) central for the GRTMS (controlled by CRO); 3) regional control of groupings of hotels (controlled by CRO); and 4) local for a specific HRO (controlled by that specific hotel).

The global scope Control Information is accessible to each CRO and HRO as read-only (static) data. If HQO is on a separate computer, updates made at HQO are propagated to the CRO in a high priority manner. The central and regional scope Control Information is accessible to each HRO as read-only (static) data. Updates made at CRO are immediately accessible to every on-line node. The local scope Control Information contains data only for that Hotel's HRO. This data is actually located at the CRO. Updates made to this data at HRO are immediately accessible to all operational nodes.

Some dynamic Control Information are values that change due to external factors, such as international currency exchange rates. This type of dynamic Control Information are read-only data. The CRO has responsibility for updating the values of dynamic Control Information.

Incrementing Control Information are certain maintainable sequential numbers for the GRTMS. Typical sequential numbers that may be controlled and utilized are: reservation confirmation number, reservation cancellation, number, group number, convention number.

These sequential numbers are global, but are made into a unique key value within the GRTMS by prepending its originating node code to the number. This key also explicitly identifies the originator of any of the relevant records that were created using this value.

VII. Booking, Availability and Rate (BAR) Engine

Overview

The GRTMS functional capabilities for the Booking, Availability and Rate (BAR) module (Engine) is next described. Booking is the confirmation or denial of a reservation stay request. Availability is the detailed selling status for a reservation stay request. Rates determine the selling price of an offering in a particular booking circumstance. These three functions are grouped into one module called an Engine.

Attribute Inventory System

In the following discussion, "attribute combination" means all possible combinations of the set of requested attributes including individual attributes.

The BAR Engine is based on an Attribute Inventory System (AIS). Before discussing the AIS, a brief discussion of conventional mechanisms of assigning inventory is warranted. Traditionally, inventory systems track the existence of inventory by physical presence. For example, when a guest calls a hotel to reserve a room, the hotel uses a very basic mechanism to reserve the inventory for the guest, namely by assigning the guest a particular room (e.g., "Room Number 103"). Such a system is not a very flexible mechanism for assigning inventory, because rarely do guests simply request a room to stay. Instead, guest often request rooms with certain attributes, or features. Such attributes may include, but are not limited to: two queen size beds, a single king size bed, a wet bar, a whirlpool tub, a separate sitting room, an ocean view, a smoking room, a non-smoking room. Virtually any attribute may be used to describe and discriminate rooms in a particular hotelier's inventory.

One somewhat coarse solution to this problem is to assign each room a "room type." The room type describes some of the features of the inventory in a manageable way. For example, the hotelier may break his inventory into 3 or 4 room types, such as: 1) two queen size beds, 2) two queen size beds and an ocean view, and 3) a king size bed and an ocean view. In this solution, when a guest makes a reservation, the guest is actually reserving a room type (i.e. a set of features) rather than a particular room. The particular room is not actually assigned to the guest until check-in.

This approach suffers from at least two limitations. The first limitation becomes apparent by not allowing the rooms to distinguish themselves in ways other than the specified types. The hotelier is forced to ignore other attributes associated with his inventory. In the example above, none of the room types specify attributes such as smoking or non-smoking, etc. Therefore, it is not possible for the hotelier to reserve the guests additional attribute requests without actually assigning a particular room.

The second limitation is that the hotelier cannot match an exact feature request. Using the three room types described above, if the guest calls to reserve a room with an ocean view, the hotelier is forced to either assign the inventory from the two-queen-size-bed-and-ocean-view room type or the king-size-bed-and-ocean-view room type. If the hotelier assigns the guest the two-queen-size-bed-and-ocean-view room type, and later, a rush of guests deplete his inventory of rooms with queen size beds, the hotelier must turn away all subsequent requesters of a room with queen size beds. In this case, if the hotelier had not been forced to make the initial room assignment, at least one more room could have been sold while still satisfying all the guests' requests.

The present invention uses an Attribute Inventory System (AIS) to solve the problems mentioned above. The AIS is configured to handle any and all attributes that the hotelier wishes to track, limited only by his imagination and the distinguishing attributes of his inventory. In the AIS, a room is reserved only according to the attributes (i.e., features) that the guest requests. In the example above, the AIS would reserve the initial guest a room from the combined inventory of the two-queen-size-bed-and-ocean-view room type and the king-size-bed-and-ocean-view room type as both room types meet his requirement of an ocean view. In doing so, the hotelier is able to allocate his queen size beds and king size beds based on the requirements of other guests as long as one room with an ocean view is identified and reserved for the initial guest.

Figure 4:
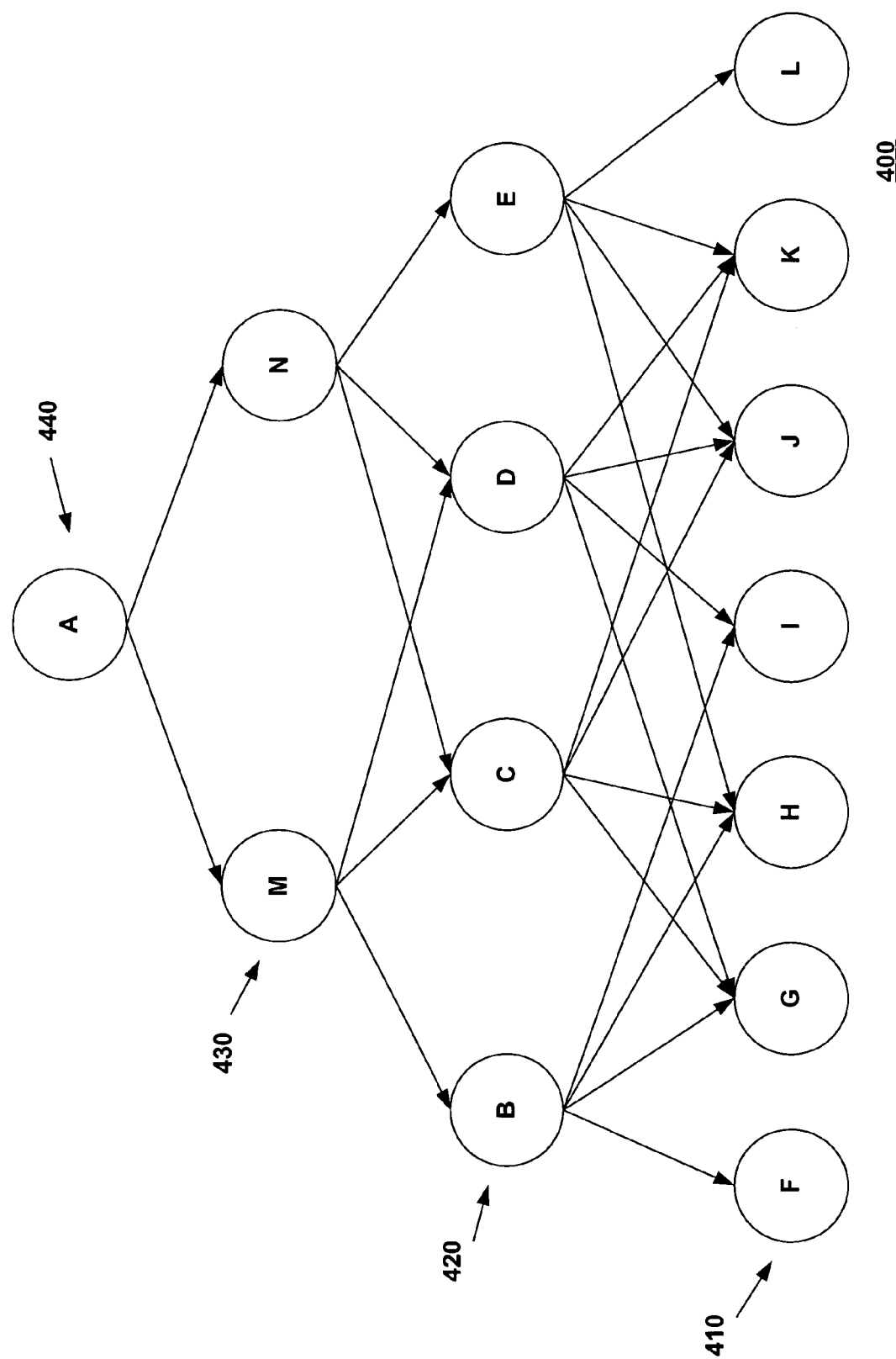
FIG. 4 is illustrates an organization of a hotel's room inventory according to one embodiment of the present invention.

FIG. 4 illustrates an exemplary inventory 400 for purposes of this discussion. Inventory 400 is comprised of a Run-of-House inventory (ROH) 440 (shown as "A" in FIG. 4), a first level of attribute combinations 430 (shown as "M-N"), a second level of attribute combinations 420 (shown as "B-E," respectively), and third level of attribute combinations 410 (shown as "F-L"). Third level 410 represent the most specific combinations of the features of the room found in the hotelier's inventory. In other words, each of third level 410 includes the most number of attributes in inventory 400. Note that each of the attribute combinations in third level 410 is distinct from each other attribute combination in that each represents a unique combination of room attributes. For example, attribute combination "F" may represent non-smoking rooms, with queen size beds, deluxe accommodations and an ocean view; attribute combination "G" may represent non-smoking rooms with a king size, bed, deluxe accommodations and an ocean view; attribute combination "H" may represent non-smoking rooms with a queen sized bed, economy accommodations and an ocean view; and attribute combination "I" may represent non-smoking rooms with a king sized bed, economy accommodations and an ocean view.

Second level attribute combinations 420 include one or more of third level attribute combinations 410 (illustrated as a connecting lines between the two levels). In the example provided, second level attribute combinations 420 represent at least two features that are shared by its respective third level attribute combinations 410. As illustrated, second level attribute "B" includes third level attribute combinations "F." "G." "H," and "I." These third level attribute combinations share at least two features: non-smoking rooms with an ocean view. Thus, second level attribute combination "B" represents those rooms in inventory 400 that are non-smoking rooms with an ocean view.

First level attribute combinations 430 include one or more of second level attribute combinations 420. First level attribute combinations are less specific than second level attribute combinations. As illustrated, first level attribute combination "M" includes second level attribute combinations "B." "C," and "D," and "N" includes second level attribute combinations "C," "D," and "E." First level attribute combination "M" may, for example, represent those rooms in inventory 400 that have an ocean view. Accordingly, second level attribute combinations "B," "C," and "D" would all represent rooms with ocean views. Note also that the rooms in inventory 400 represented by second level attribute combination "E" would not have an ocean view.

Finally, ROH inventory 440 includes all possible attribute combinations in inventory 400. ROH inventory 440 represents the "run of the house," or in other words all the rooms in inventory 400. From the perspective of ROH inventory 440 a "room" is a "room."

The present invention uses this particular organization of inventory 400 to properly allocate its resources among its guests. At each of the levels of attribute combinations in inventory 400, the present invention tracks the number of rooms available at each level on each given day. For example, assume no rooms are presently reserved for a particular day and inventory 400 includes 100 rooms. ROH inventory likewise includes 100 rooms. Assuming that three quarters of the rooms in inventory 400 have an ocean view (and also that this is at least one mutually exclusive distinguishing feature between "M" and "N"), first level attribute combination "M" represents 75 rooms while first level attribute combination "N" represents the remaining 25 rooms. Likewise, of the 75 rooms with ocean views a portion are non-smoking rooms as well. These rooms are represented and tracked by second level attribute combination "B." Similarly, the remaining attribute combinations track the number of rooms in inventory 400 that correspond to their particular attributes.

As illustrated in FIG. 4, attribute combinations exists on relative levels. As would be apparent, this need not be the case. Various combinations of attributes may exist among inventory 400 that would require an organization of unique combinations other than (and likely much more complex than) that in FIG. 4.

When a guest requests a room, the present invention records or otherwise identifies that request against at least one of the attribute combinations of inventory 400. If the guest merely requests a room, the present invention merely records that request against ROH inventory 440. In other words, as no specific attribute was requested, any room will suffice for this guest. Accordingly, this request is recorded against no other attribute combinations.

However, if the guest requests an ocean view room, the present invention records that request against both ROH inventory 440 as well as first level attribute combination "M" (recall that "M" represents those rooms in inventory 400 with an ocean view. In a preferred embodiment of the present invention, a "direct" request is made against the inventory of (i.e., number of rooms represented by) "M" while an "indirect" request is made against the inventory of ROH inventory 440. The difference between "direct" and "indirect" is based on whether a lower level attribute combination is required to handle the requested combination of attributes. In this simple example, the number of rooms available for each attribute combination is the total number of rooms represented by that attribute combination less the sum of the direct and indirect requests against that inventory.

As further example, if a guest requests a non-smoking room with an ocean view, a indirect request would be made against ROH inventory 440 and first level attribute combination "M" and a direct request would be made against the inventory of second level attribute combination "B." Further requested features (if available) would require accounting against the inventory of "F," "G," "H," or "I" as would be apparent.

In this manner, inventory 400 is tracked based on each guest's requests to properly allocate inventory 400 among the guests. In the event that a guest requests features that are no longer available, the guest's requests must be refused or otherwise accommodated as discussed below.

While discussed above in relatively simple terms, the problem becomes significantly more difficult as guests requests rooms for multiple days or groups request multiple rooms with similar feature for multiple days.

Once inventory 400 is organized in this fashion and relevant features (i.e., attributes) identified, actually assigning inventory 400 to a particular guest at the time of check-in becomes a relatively straightforward optimization problem. Various well-known linear optimization techniques may be used to formulate an appropriate solution. Furthermore, these optimization techniques may include additional considerations other than merely the hotels inventory. For example, in order to maximize profits, the optimization techniques may be adjusted to properly allocate rooms based on those features most desired or those rooms that justify premium pricing. In a preferred embodiment of the present invention, a simple recursive mechanism is used to allocate inventory 400 against the guests' requests. Such recursive mechanisms are well known to those skilled in the art.

Reservation Stay Request

The reservation stay request is the booking information for the prospective guest stay. For the purposes of the BAR Engine, this information consists of the hotel, arrival day, departure day, number of rooms requested, the occupancy and any requested attributes. In the following discussion, the term "stay request" means this information.

Availability

Availability determines if a particular stay request can be booked or if it must be denied. Availability consists of a variety of stay controls and inventory counts. Availability for the stay request is determined by analyzing the stay controls for each attribute combination for each stay day. The analysis stops and the stay request is denied if any attribute combination is closed-out or otherwise sufficiently restricted for that day. In this case, no further attribute combinations are analyzed and none of the subsequent stay days need be analyzed. If no close-outs or restrictions are encountered during the stay, then the inventory counts are analyzed for each stay day. If there is sufficient inventory to honor the stay request, then the stay request may be booked. At some point during the stay request processing after the availability analysis and before the confirmation, the inventory counts associated with this stay request may be temporarily decremented and held for subsequent disposition (i.e., confirmed or not accepted).

Stay Controls

Availability stay controls consist of various restraint flags (booleans), stay length requirements (tiny integers<256) and guarantee levels (tiny integers<256) for a given stay. Stay controls are the primary means of assessing whether a booking may be made or is to be denied. There are stay controls for every attribute combination for every hotel date. The following required stay controls in Table I are listed from the least to most restrictive:

TABLE I

| STAY CONTROLS | |
|---|---|
| Stay Control | Meaning of stay control if value is TRUE (>0) |
| INVENTORY | An inventory count exists (see INVENTORY below) to track the bookings and limits. |
| ALLOTTED | If Run-of-House (ROH): An allotment has been made when a non-ROH inventory type was created. If non-ROH: then adjust real and/or virtual allotment (see ALLOTMENTS below). |
| GUARANTEE POLICY | A guarantee policy applies (0 means no guarantee required, >0 is the number, higher is more restrictive). |
| ALERT-YMS | Notify YMS if this attribute combination is booked. |
| MIN-STAY | Minimum number of stay days required (0 is no minimum stay in force, 1 is ineffectual). |
| MAX-STAY | Maximum number of stay days allowed (0 is no maximum stay in force). |
| NO-ARRIVAL | Cannot book this attribute combination if arrival day is this date |
| GDS-CLOSED | Global Distribution Systems (Airline CRS) cannot book this attribute combination this date. |
| REQUEST-ONLY | Cannot book this attribute combination, but do accept waitlist requests. |
| CLOSED-OUT | No system can book any reservation requesting this attribute combination on this date |
| BAR-CLOSED | Book a Request cannot book this attribute combination on this date |

Stay controls may be set manually or automatically and take effect immediately. Authorized staff at the hotel and/or CRO may adjust stay controls. All reservation processes that perform booking functions set certain stay controls automatically as part of their normal operations. The YMS may also set certain stay controls automatically or semi-automatically. All current stay control values and/or a log of all their changes may be displayed upon request by authorized staff.

Inventory

Availability inventory contains counts of the attributes for the various types of inventory: General run of house (ROH), Corporate, Group, Convention, Package and Market Segment. All inventory types except ROH require a prequalification, as shown below in Table II:

TABLE II

| AVAILABILITY INVENTORY | |
|---|---|
| Inventory Type | who may book |
| General (ROH) | anyone who calls |
| Corporate | qualified employees |
| Group | members of a group |
| Convention | convention attendees |
| Package | a qualified traveler |
| Market segment | a kind of guest |

The ROH inventory will exist for any hotel date. Also, the ROH inventory is the source for all other inventory types. This means that when the other types of inventory (referred to as "non-ROH") are created their counts are allotted from ROH. See ALLOTMENTS section below. Each attribute combination has several counters associated with it, as shown in Table III.

TABLE III

COUNTERS

| Counter | Purpose |
| --- | --- |
| CONFIGURED | If ROH, this is the physical count of this attribute combination: |
| | If non-ROH, the total allotted from ROH or the limited number allowed to be booked. |
| OVERBOOK | Allow this many bookings over the CONFIGURED count. |
| HELD-BACK | Count of this attribute combination that is not available or out of service. |
| LOCATION | (for ROH only): Count of this attribute combination allotted to all non-ROH inventory types. |
| ARRIVALS | Count of this attribute combination whose reservation's arrival day is this date. |
| STAY-THRUS | Count of this attribute combination whose reservations post-arrival stay days is this date. |
| WAITLISTED | Count of this attribute combination whose reservation stay days are on waiting list. |

The inventory counts can affect the availability analysis. If a booking request analysis passes the stay controls availability and INVENTORY stay control is YES, then the AVAILABLE count must be calculated. If AVAILABLE count is insufficient to honor the booking request, then the booking is denied, i.e., the availability check fails; however, such an event may be overridden. Using the above counters, the AVAILABLE count of an attribute combo on any day is calculated as follows:

AVAILABLE (on a given day)=CONFIGURED+
OVERBOOK−HELD-BACK

−ALLOCATION (only if ROH)−ARRIVALS−STAY-THRUS

−WAITLISTED

When AVAILABLE is zero or less, then CLOSED-OUT stay control will be set to YES automatically after the booking is confirmed.

Threshold values that cause the change of a stay control are also kept as inventory as shown in Table IV.

TABLE IV

THRESHOLD VALUES

| Counter | Purpose |
| --- | --- |
| ALERT-LEVEL | Set ALERT to YES if AVAILABLE is at or below this count. |
| CLOSE-GDS | Set GDS-CLOSED to YES if AVAILABLE is at or below this count (cause close-out of GDS). |
| OPEN-GDS | Set GDS-CLOSED to NO if GDS-CLOSED was YES and AVAILABLE increases above this count (GDS now reopened). |
| CLOSE-BAR | Set BAR-CLOSED to YES if AVAILABLE is at or below this count (cause close-out of BAR). |
| OPEN-BAR | Set BAR-CLOSED to NO if BAR-CLOSED was YES and AVAILABLE increases above this count (BAR now reopened). |

Other counters in the inventory are shown in Table V.

TABLE V

OTHER COUNTERS

| Counter | Purpose |
| --- | --- |
| NON-GTD | Count of ARRIVALS that are not guaranteed (reservation's GUARANTEE is zero) |
| GROUP-MEMBERS | Count of attributes for confirmed group reservations not allotted to Group class |
| GROUP-MAYBE | Count of attributes for possible groups (reference only) |

The inventory count is adjusted only if INVENTORY stay control is YES. An authorized database operator may change certain inventory counters, but these changes are logged in an audit file. All reservation processes that perform booking operations also adjust inventory counts as part of their normal operations. All inventory adjustments regardless of the process involved will take effect immediately. All current inventory counts may be displayed including a log of all manual changes made. Automatic changes to stay controls may result from inventory counts passing a threshold.

Allotments

When a non-ROH inventory type is created, an allotment from ROH is optional. An allotment is the transfer of inventory from a general inventory (ROH) attribute combination to its namesake in a non-ROH inventory type (group, package, etc.). There are three kinds of allotments: real, virtual and limited.

A real allotment actually transfers inventory between the ROH attribute combination and its namesake attribute combination in the new non-ROH inventory. All subsequent calculations and adjustments then take place using the allotted-to attribute combination, not the allotted-from attribute combination count. A virtual allotment means that the count of the attribute combination in ROH will be used for the AVAILABILITY calculation of the specified non-ROH attribute combination. Whenever a virtually allotted attribute combination is booked, the ROH's counts will be adjusted. A virtually allotted item may be booked so long as it passes its stay control checks and its ROH AVAILABILTY is adequate. The virtually allotted attribute combination does not close out until the ROH attribute combination closes out. A limited allotment is a combination of real and virtual allotments. It means that the number of bookable non-ROH attribute combinations may not exceed a limiting quantity, but it will also be closed out if the ROH attribute combination is not available. When a non-ROH attribute combination is booked, both the ROH's and non-ROH's count will be adjusted.

Rates

According to a first embodiment, rates determine the selling price associated with a stay request. Rates are calculated from a specific rate and an optional adjustment for the attributes in the stay request. The specific rate for the inventory type (ROH or non-ROH) requested was created from a generic rate. Generic rates reflect the rate policy of the hotel for a period of time. Typically, specific rates are created for: standard (rack) rates, group discounts, private negotiated rates, corporate rates, and packages. Specific rates may stand alone or may refer to its generic rate.

To figure the actual rate in a particular booking circumstance, first, establish the specific rate to use (rack, group, etc). Secondly, find the specific rate for the period associated with the stay day. Thirdly, if the specific rate stands alone, use the rate amount corresponding to the occupancy in this stay request (single, double, etc), modified for day-of-week, if applicable. Fourthly, if the specific rate refers to its generic rate, find the generic rate for the period associated with the stay days using the rate amount from the generic rate for the occupancy requested and modify this rate amount by the instructions in the specific rate (e.g., no change (use the generic rate amount directly), increase/decrease generic rate amount by a percentage, increase/decrease generic rate amount by a fixed amount, apply any day-of-week modification). Finally, for any relevant attribute combinations, make adjustments including: no change (use modified specific rate), increase/decrease specific rate amount by a percentage, increase/decrease specific rate amount by a fixed amount, apply any day-of-week modification.

The above steps are repeated for each stay day of the request to arrive at the total rate for the stay request. Note that due to rate seasons and/or day-of-week modifications, there may be a different rate amount for each day of the stay.

According to a second embodiment of the present invention, rates determine the Price of a reservation component. The Price is the calculated amount of money asked for the component associated with a specific stay request. The component is usually a room but could be a service. The amount is calculated using the algorithm of an appropriate Rate Season. A Rate Season reflects the rate policy of the hotel for a period of time. The appropriate Rate Season is determined by the Rate Code and stay day. The Rate Code is a common identifier between a specific Rate Plan and one or more Rate Seasons. The Rate Plan may stand alone or may be specified by a Program. Programs are deals created for marketing purposes. Typically, Rate Plans are created for: standard (rack) rates, group discounts, private negotiated rates, corporate rates, and packages.

To figure the Price for a room component in a particular booking circumstance, first, solicit the minimum stay request information: a specific hotel, one or more consecutive stay days, occupancy and any room attributes. Secondly, establish the specific Rate Plan and Rate Code to use. The Rate Plan may be specified by a Program (AAA deal, etc), negotiated rate, group discount, package or simply the rack rate (default). The Rate Code is common to the Rate Plan and Rate Season.

Thirdly, for a stay day, the specified Rate Code, and any requested attributes, find the applicable Rate Season. If no Rate Seasons apply, there is no rate defined and no Price can be quoted. The Rate Season record matches the Rate Code. The Rate Season start date is inclusively closest to the stay day and whose end date is not earlier than the stay day. Any requested attributes are mutually inclusive with all of the Rate Season required attributes (if any).

Fourthly, determine the price level in effect for the stay day. Fifthly, using the algorithm in the Rate Season (see below), calculate the Price.

The first four steps are repeated for every stay day of the request to arrive at the total Price for the stay. Note that due to changes in rate seasons and/or day-of-week adjustments, there may be a different Price for each day of the stay.

The Rate Season Algorithm is determined as follows. First, if there is a referenced Rate Season, find that Rate Season record using the referenced Rate Code and the specified stay day. If the record cannot be found or the stay day does not apply, there is no rate defined and no Price can be quoted. If the referenced Rate Season record is valid, calculate its Price recursively using this algorithm. Add the Offset Amount (see below) to the Price from the step above. Fractional dollar amounts are rounded to unit dollars. Secondly, if there is no referenced Rate Season, set the Price equal to the Base Amount.

Third, add the various Adjustment Procedure amounts (see below) to the Price from step 1 or 2 as applicable. The amounts are independently calculated based upon only the referenced or base Price, then added together. Fractional dollar amounts are rounded to unit dollars. For any AIS Plan Price-determining attribute categories and values (see below) add to the Price from step 1 or 2 as applicable. The amounts are independently calculated based upon only the referenced or base Price, then added together. Fractional dollar amounts are rounded to unit dollars.

The Adjustment procedure is as follows. First, adjust for occupancy using its specified amount and offset procedure. This is an array of occupancies, not a multiplier. Secondly, adjust for day-of-week using its specified amount and offset procedure. Each day may have a different amount, but the procedure is common to all days. Thirdly, adjust for length of stay using its specified amount and offset procedure. This is an array of lengths of stays, not a multiplier. Finally, adjust for price level using its specified amount and offset procedure. This is an array of price levels, not a multiplier.

The AIS Plan Procedure is as follows. First, using the AIS Plan ID, stay day, attribute category and its value, find the applicable AIS Plan. Note that the AIS Plan start/end dates are not necessarily congruent with the Rate Season's start/end dates. Secondly, adjust for the attribute value using its specified amount and offset procedure.

The Procedure for calculating Offset Amount may be determined by the following: 1) no change, 2) add (subtract) fixed amount to (from) Price; or 3) increase (decrease) Price by percentage.

VIII. Wrap-Up Statistics Capture

Overview

The following is a description of the wrapup statistics gather and processing operations of the GRTMS for reporting and CYMS purposes. "Wrapup" is the capture at the end of every voice or automatic reservation of the result of that reservation request. If the request was not converted to a booking then the reason for the negative result is also captured.

Business Achieved

CRS Business achieved (or contribution to hotel occupancy) is the conversion of incoming reservation requests to confirmed bookings. Reservation requests may take the form of calls to a voice agent, Type-A or Type-B GDS messages or Internet traffic. Requests may not be successfully converted to a confirmed booking for a variety of reasons discussed below. The "CRS contribution to hotel occupancy" is determined as:

BILLABLE BOOKINGS=RESERVATIONS RECEIVED AND CONFIRMED−CANCELLED RESERVATIONS+REINSTATED RESERVATIONS

Reservation Request Received

As described above, reservation requests received may take the form of calls to a voice agent, Type-A or Type-B GDS messages or Internet traffic. All voice agent reservations sessions entailing a conversation between a voice agent and a call (prospective guest) are defined as manual reservations. All other reservation requests are defined as automatic reservations.

Booking Context

The GRTMS automatically tracks the context of all voice agent reservations sessions. This is a capture of the sequence of all relevant events that occurred during the guest-voice agent conversation. For example, a guest may resist the first quoted rate, but then accept the next quoted lower rate. If a confirmed booking results, the fact that rate resistance was also encountered will be captured. If the caller abandons the session at any point, the reservation program is able to semi-automatically determine the reason for the abandonment. This booking context information will be very valuable to the CYMS, although it will not directly affect the business achieved reporting.

No Hotel at Location

The situation of no hotel in the city or locale requested may be dealt with a couple of ways, Note that a chain's hotel may technically be in the requested city or locale, but is actually too far distant to the caller's local destination. If there is a cross-chain selling arrangement, then that chain may be searched for a hotel in the city or locale. If applicable, the call may then be referred or transferred as appropriate. In any case, the requested city or locale is captured as part of the wrapup. Certain locations may be pre-defined by the chain as prospective and these will be specifically noted.

Denied Due to Closeout

Reservation requests may be denied because the entire hotel is closed out (i.e., fully occupied) on one or more days of the requested stay. If no alternate hotel is available, then this business is lost due to a hotel close out. Likewise, one or more requested attributes may be closed out. If this attribute is "mandatory" for the caller, then this business is lost due to an attribute close out.

Denied Due to Stay Restriction

Reservation requests may be denied because some stay restriction is not met. For example, the GRTMS may impose a two-day minimum stay on the requested arrival day, but the caller is only requesting a one day stay. If the caller resists staying two days in order to qualify, then this business is lost due to a stay restriction.

Rate Resisted by Caller

A reservation request may be withdrawn by the caller if all available.

IX. The PMS Wrapper

The PMS wrapper interfaces to any PMS system present at the hotel property. The PMS wrapper provides the ability to send reservation information to and receive up-to-date inventory and guest information from the PMS system.

Sending Reservations

The PMS wrapper receives reservation information from the GRTMS Delivery subsystem and translates those objects into the appropriate PMS specific file format. These files are then placed on the network drive that the PMS provider uses for processing. These files-preferably conform to the specifications defined in "Front Office Documentation, Central Reservation Interface Standard Specifications One-Way-CRS and Two-Way-CRS."Once the file has been placed in the network drive, the PMS wrapper will track the reservation through the following states: 1) Correct processing of the reservation file; 2) Guest check-in; 3) Guest no-show; 4) Guest early departure or extension; 5) Guest room change; 6) Guest checkout; 7) Reservation Cancellation (PMS generated); and 8) Preblocked RMS. The GRTMS system is notified of any and all of the above state changes through a CORBA channel. The PMS wrapper maintains a persistent store, outside of PMS, of reservation information being tracked.

Travel Agent Information

Travel agent information is sent with the reservation data, when available. Travel agent IATA numbers will be used (if supported by the PMS) to associate agents to reservations.

Receiving Updates

When the guest arrives the PMS wrapper tracks any changes to the guest record. These changes are relayed back to the GRTMS.

X. Data Maintenance Interface

The following is a description of the interface and operation associated with data maintenance in the GRTMS. In general, each of the hotels will be responsible for populating much of the initial system configuration and inventory. In addition, the hotel will also be responsible for updating information on a continuing basis using the interface and procedures discussed below.

Usability Interface

The hotel data maintainer is the person that will enter and maintain the hotel's information within GRTMS. This person is familiar with the hotel's operations as well as with the application, they will not be a novice user. The data maintenance function primarily involves data entry. The user interface is straightforward and lends itself to aiding the user in navigating through the many screens necessary to input the hotel's information. In addition, the interface will uses the same widgetry as the other GRTMS modules such that users can expect the same functionality from each widget regardless of the GRTMS application they are using.

Maintain Login Security

In one embodiment, the GRTMS uses the operating system's security capabilities to control the user's access to the application. For example, the hotel's CRO/HRO computers is setup such that reservation agents can only access the reservation application. Whereas, a data maintainer can access the data maintenance application in addition to the reservation application.

Enter System Configuration Parameters

The GRTMS system can be configured to function specifically for a hotel's operations. To do this, the GRTMS allows each hotel to specify how the system should behave and the values to use for validations. In one embodiment, this information is entered into text file, parsed, and read into the system.

Maintain Chain and Maintain Hotel

Each hotel needs a large amount of data entered to be able to book, change and cancel reservations. The data maintenance application provides simple screens to aid with the entry of that data. The system allows the user to create a new hotel. In doing so, the user must preferably enter the following information about the hotel as shown in Table VI.

TABLE VI

HOTEL INFORMATION

| Attribute Name | Type | Description | Max. Length |
|---|---|---|---|
| Property Name | Text | Name for this property. This is the name by which the property wants to be represented. | 100 |
| Property ID | Text | Unique ID for property from Source system. | 10 |
| Property Main Phone Number | Char | Main phone number at the property | 25 |
| Property Reservation Phone Number | Char | Reservations phone number at the property. | 25 |
| Property Mailing Address | Address | Property's mailing address. | |
| Property Street Address | Address | Must be something that the user can find on a map or drive to rather than a mailing address. | |
| Number of Total Rooms/Units | Integer | Total number of rooms available for rent at this property, including all types of rooms and suites. | 6 |
| Nearest Cross Street | Text | Closest cross street for mapping purposes. | 40 |
| Nearest Major City | Text | Closest major city. | 40 |
| Payment Type | Char | Drop list of payments types including: American Express, Carte Blanche, Coupons, Debit Cards, Diners Club, Discover Card, EuroCard, JCB Accepted, MasterCard, Visa, Personal check, MCO, Pre-authorized voucher, Traveler's check, Cash, Enroute, TA guarantee, and EuroCheck. | |
| Use for Deposit | Boolean | Can this payment type be accepted for a deposit? Each payment type will have a value defined for this field. | |
| Use for Guarantee | Boolean | Can this payment type be accepted for a guarantee? Each payment type will have a value defined for this field. | |
| Use for Prepayment | Boolean | Can this payment type be accepted for a hotel prepayment? Each payment type will have a value defined for this field. | |
| Use for Payment | Boolean | Can this payment type be accepted for a hotel payment? Each payment type will have a value defined for this field. | |
| Check-in Time | Char | Earliest time for normal check-in. | |
| Check-out Time | Char | Latest time for normal check-out. | |
| Children Stay Free | Boolean | Do children stay free with parents? | |
| Age Children Stay Free | Integer | Children under this age are allowed to stay for free with parents. If this is 99, then all children (including adult children) are allowed to stay free in room with parents. | |
| Pets Allowed | Boolean | Are pets allowed to stay in the hotel? | |
| Extra Charge For Pets | Float | The extra charge for a guest with a pet. If this field is zero, there is no extra charge for a pet to stay. | |
| Cancellation Policy | Text | The cancellation policy for this property. | |
| Hotel Graphics | | The location of the graphics to be displayed in the reservation system. | |

In addition to initializing the above data, the data maintenance program provides the ability to lookup and retrieve an existing hotel such that the data maintainer can update the hotel's data.

Payment Policies

The hotel needs to have the ability to define the payment types the hotel will accept for deposits, guarantees, prepayments, and payments. Table VII outlines the information required for each accepted payment.

TABLE VII

PAYMENT INFORMATION

| Attribute Name | Type | Description |
|---|---|---|
| Payment Type | Char | The hotel will specify a type by selecting on the following values from a drop list: American Express, Carte Blanche, Coupons, Debit Cards, Diners Club, Discover Card, EuroCard, JCB Accepted, MasterCard, Visa, Personal check, MCO, Pre-authorized voucher, Traveler's check, Cash Enroute, TA guarantee, and EuroCheck. |
| Use for Deposit | Boolean | The hotel specifies if the selected payment type is accepted for a deposit? |
| Use for Guarantee | Boolean | The hotel specifies if the selected payment type is accepted for a guarantee? |
| Use for Prepayment | Boolean | The hotel specifies if the selected payment type is accepted for a hotel prepayment? |
| Use for Payment | Boolean | The hotel specifies if the selected payment type is accepted for a hotel payment? |
| Starting Number | Integer | For credit cards, the hotel specifies the starting number of the card holders |

TABLE VII-continued

PAYMENT INFORMATION

| Attribute Name | Type | Description |
| --- | --- | --- |
| | | number. This number is used to validate the customer's credit card. |
| Checksum Value | Integer | For credit cards, the hotel specifies the checksum value that is the result when the card holder's number is run through the checksum algorithm. This number is used to validate the customer's credit card. |
| Digits in Card Number | Integer | For credit cards, the hotel specifies the expected number digits in the card holder's number. This number is used to validate the customer's credit card. |

Stay Controls

The hotel needs to be able to define the stay controls that are checked when a reservation is booked. Table VIII lists the stay controls that are checked by the Billing and Reservation (BAR) Engine. The system provides an interface for the data maintainer to enter the values for stay controls for a specified hotel and a specified date. Once the stay controls are modified, the system notifies the BAR engine of the new values. The BAR engine then uses the new values when booking future reservations. Existing reservations are not be checked against the new values.

TABLE VIII

STAY CONTROLS

| Stay Control | Type | Description |
| --- | --- | --- |
| Allotted | Boolean | If ROH: An allotment has been made when a non-ROH inventory AID combination was created.<br>If non-ROH: then adjust real and/or virtual allotment. |
| Guarantee | Integer | A guarantee policy applies. A value of 0 means no guarantee is required. Non-zero numbers demonstrate more restrictive guarantee policies as the number increases. |
| Alert-YMS | Boolean | Notify YMS if this attribute combination is booked. |
| Min-Stay | Integer | Minimum number of stay days required. A value of 0 means no minimum stay in force. A value of 1 means the minimum stay is ineffectual. |
| Max-Stay | Integer | Maximum number of stay days allowed. A value of 0 means no maximum stay in force. |
| No-Arrival | Boolean | Cannot book this attribute combination if arrival day is this date. |
| GDS-Closed | Boolean | Global Distribution System (Airline CRS) cannot book this attribute combination on this date. |
| Request-Only | Boolean | Cannot book this attribute combination, but do accept waitlist request. |
| Closed-Out | Boolean | No system can book any reservation requesting this attribute combination on this date. |

Maintain Rates

The GRTMS allows the hotel data maintainer to create rate categories, rate plans and rate seasons. Rate categories are used to group similarly used rate plans. Rate seasons are used to determine the cost of a room based on many variables including nightly cost, add-on costs for multiple occupancy, and effective dates. Rate plans are used to determine the charge to the customers for renting a room. The information that is defined for each rate plan includes rate seasons, stay controls, parent rate category. In addition to providing the ability to create new rates, the system allows the hotel data maintainer to view existing rate definitions and the update the definitions.

View Availability

The system provides the functionality to view the room availability for a hotel during a specified time frame. This information is displayed in a set of calendars. The system provides a summary if the hotel is open or closed out. The system also provides an interface such that the hotel data maintainer can specify maximum, real, or partial attribute combinations to view the availability count.

Data Loads

The GRTMS is able to load information from external sources into the system. This includes Travel Agents provided by IATA and Zip Codes provided by the Postal Service. The hotel data maintainer does not have access to this data to update it, therefore no interface is needed for maintenance.

XI. Room Price Calculation Algorithm

One of the key functions of the GRTMS involves the calculation of Room Prices. The implementation of this function is next described.

Relevant Domain

The following section describes the relevant domain objects and attributes involved. They are provided to frame the understanding of how a room's price is calculated for a given night.

Price Level: Price Levels are used to scale elements involved with rate calculation to reflect fluctuations in marketing techniques. For example, the airline industry may divide the available coach tickets of an airplane into three categories of seating: high, medium, and low. The price of a high seat may be $300, a medium seat $200, and a low seat $100. The coach tickets exhibit no attribute difference other than price. The airline may decide that 20% of the seats are high, 60% medium, and 20% low. The airline industry would manipulate the number of available Price Levels in attempt to maximize seat sale and profit. A Price Level is composed of the following attributes:

Id: an identifier that uniquely identifies the Price Level.

Index: an identifier (such as an integer) that represents the Price Levels relative position in a series of Price Levels. In other words, Price Levels exist in an ordered scale (with respect to one another.) The index facilitates this ordering.

Price Level Registry: The Price Level Registry contains all existing Price Levels. This component is responsible for maintaining the Price Levels. Price Levels are ordered, and must remain in an ordered format. Changing Price Levels is a significant task, and many other components in the system may need migration. For example assume that an air carrier has three divisions of Price Levels: H, M, and L. Also assume that 20% of the seats are, H, 60% M, and 20% L. If the Price Level Registry is modified such that the available Price Levels become H, M1, L, M3, and M2, some problems arise. Where in the earlier Price Level model L represented the lowest scale, now M2 is the lowest scale. All components in the system that rely on Price Level need migration to reflect the new ordering context. More importantly the previous Price Level M has been removed. Thus any component that was referencing M needs now reference a currently available Price Level.

Price Level Adjustment: A Price Level Adjustment describes an offset associated with a Price Level. A Price Level Adjustment is composed of 1) Price Level: a reference to the Price Level that this adjustment is representing; and 2) Offset: a percent and/or monetary offset of some monetary amount.

Price Level Adjustment Interval: A Price Level Adjustment Interval contains some Price Level Adjustments. The Price Level Adjustments must reflect a contiguous subset span of the Price Levels existing in the Price Level Registry. For example, assume that a Price Level Registry contains the following Price Levels (listed in ascending order): 1) Price Level (A); 2) Price Level (B); 3) Price Level (C); and Price Level (D).

Then there may exist a Price Level Adjustment including the following Price Level Adjustments. (Note that in the example, a $ sign represents some monetary unit—not necessarily dollars.):

Price Level Adjustment (B, +10%+$0)
Price Level Adjustment (C, +5%+$0)

This example is valid since the contained Price Level Adjustments reflect Price Levels that fall in a contiguous span.

The following example is invalid:
Price Level Adjustment (A, +10%+$20)
Price Level Adjustment (D, +0%)

This example is invalid because the contained Price Level Adjustments reflect Price Levels that do not fall in a contiguous span.

A Price Level Adjustment Interval should be able to return the most appropriate of its Price Level Adjustments for an input Price Level. For the trivial case when a contained Price Level Adjustment's Price Level matches the input Price Level, the corresponding Price Level Adjustment is returned. For the alternate case when there is no matching Price Level Adjustment, the Price Level Adjustment who's Price Level closest matches the input Price Level is returned. For example, if a Price Level Adjustment Interval contained the following Price Level Adjustments.

Price Level Adjustment (B, +10%+$0)
Price Level Adjustment (C, +5%+$0)

And if the input Price Level was of type D, then the Price Level Adjustment (C) would be chosen. Likewise, if the input Price Level was of type A, then the Price Level Adjustment (B) would be chosen. In the simple case where a Price Level Adjustment Interval contained a single Price Level Adjustment:

Price Level Adjustment (B, +10%+$0)

It is true that Price Level Adjustment(B) would be chosen regardless of the type of the input Price Level. A Price Level Adjustment is invalid if it does not contain any Price Level Adjustments.

Price Level Narrowing Calendar: A Price Level Narrowing Calendar is capable of associating a Price Level with a Date Interval or a Date. This association occurs in a hierarchical manner such that its root represents a wide date range, iteratively to a more specific range of dates, ultimately (potentially) to a single date. For example, a hotelier might declare Price Levels with respect to the following Date Intervals.

Nov. 22, 1971-eternity; Price Level D
Jan. 1, 1998-Dec. 31, 1998; Price Level C
Jul. 2, 1998-Jul. 6, 1998; Price Level B
Jul. 4, 1998; Price Level A
Dec. 22, 1998-Dec. 29, 1998; Price Level B
Dec. 25, 1998; Price Level A
Jan. 1, 2000-Dec. 31, 2000; Price Level C A Price Level Narrowing Calendar must be able to query a Price Level with respect to a specific date. It accomplishes this by narrowing to the most specific date range or date possible, and returning the associated Price Level. For example, the Price Level for Jul. 3, 1998 is B. The Price Level for Jul. 4, 1998 is A. The Price Level for Oct. 31, 1999 and Nov. 22, 2071 is D.

Attribute Value: An Attribute Value describes a specific attribute of a room. This attribute is handled through a category value pair as described below.

Category: A category describes kinds of attributes, like room quality or bed type.

Value: A value describes one of the possible elements in a category. For example, if the category were Room Quality, the possible values might be Luxury, Standard, or Economy. If the category was Has Ocean View, the possible values would be Yes or No.

Attribute Value Season: An Attribute Value Season associates an offset with an Attribute Value. The offset is associated through a Price Level Adjustment Interval such that the offset is dependent upon a Price Level. An Attribute Value Season is composed of the following attributes: 1) Attribute Value: The Attribute Value to which this adjustment applies; 2) Date Interval: The date range to which this adjustment applies; and 3) Price Level Adjustment Interval: Describes a set of offsets. The Attribute Value Season may be queried with a Price Level to obtain an appropriate Price Level Adjustment. The Price Level Adjustment may then be used to offset the price of a room.

Rate Tier: A Rate Tier is an organization of Rate Plans (described below), Rate Seasons (described below), and Attribute Value Seasons. For example, a hotelier may organize all of her Rack Rate Plans into a common Rate Tier, and all of her corporate rate Plans into another Rate Tier. A Rate Tier is contained by a Rate Registry (defined below.) This Rate Registry will be searched in response to many queries to which the Rate Tier does not have appropriate information to respond. A Rate Tier is composed of the following attributes: 1) Rate Plans: The collection of Rate Plans that are associated with this Rate Tier; 2) Rate Seasons: The collection of Rate Seasons that are associated with this Rate Tier; 3) Attribute Value Seasons: The collection of Attribute Value Seasons that are associated with this Rate Tier; and 4) Rate Registry: The Rate Registry in which this Rate Tier is contained.

A Rate Tier may be queried with an Attribute Value and a specific Date for an appropriate Attribute Value Season. If the Rate Tier does not contain an appropriate Attribute Value Season, the Rate Tier forwards the query to its Rate Registry.

Rate Season: A Rate Season is responsible for computing the base price of a room for a given night. To assist in the computation, a Rate Season has the following attributes: 1) Date Interval: Describes the period of time between two calendar year days to which this Rate Season applies; 2) Base Price: The base price describes the base money amount of a room; 3) Sunday Qffset.: The offset to be applied if the stay date is a Sunday; 4) Monday Offset: The offset to be applied if the stay date is a Monday; 5) Tuesday Offset: The offset to be applied if the stay date is a Tuesday; 6) Wednesday Offset: The offset to be applied if the stay date is a Wednesday; 7) Thursday Offset The offset to be applied if the stay date is a Thursday; 8). Friday Offset: The offset to be applied if the stay date is a Friday; 9) Saturday Offset: The offset to be applied if the stay date is a Saturday; 10) Length Of Stay Adjustments: A collection of Integer Interval Adjustments (described below.) For example, a Rate Season may be set up such that if a room is being reserved between 5 and 10 nights, there is a 6 percent discount. Additionally, i-f a room is being reserved between 11 and 30 nights, there is an 8 percent discount; 11) Number Of Occupants Adjustments: A collection of Integer Interval Adjustments (described below). For example, a Rate Season may be set up such that if the number of occupants in a room is between 3 and 51, a 6 percent penalty is applied. Additionally, if the room will contain 5-7 occupants, a 10 percent penalty will be applied; 12) Rate Container: A Rate Tier or Rate Registry in which this Rate Season is contained; and 13) Price Determining Attributes: A collection of Attribute Value. Each Attribute Value might affect the price of a room night.

A Rate Season's Price Determining Attributes might affect the price of a room for a given night. When computing the price of a room for a given stay date, each Price Determining Attribute is used on conjunction with the stay date to discover an appropriate Attribute Value Season from the Rate Container. If an appropriate Attribute Value Season exists, its offset is applied to the price of the room for the given date.

Integer Interval Adjustment: Describes a percent and/or monetary offset applied to a room price if some attribute falls within an Integer Interval (valid range of integers that apply).

Rate Plan: A Rate Plan embodies some of the information necessary to compute the price of a room for a given night. Among its attributes, a Rate Plan includes: 1) A Referent Rate Plan: another Rate Plan who ultimately (perhaps recursively) describes the base price of a room for a given night; and 2) Some Rate Seasons: (see Rate Season below) A collection of Rate Seasons;

Rate Registry: A Rate Registry maintains all of the necessary information to facilitate rate computation within a hotel. A Rate Registry is composed of the following attributes: 1) Price Level Registry: A Price Level Registry; 2) Price Level Narrowing Calendar: A Price Level Narrowing Calendar; 3) Attribute Value Seasons: A collection of Attribute Value Seasons; 4) Rate Tiers: A collection of Rate Tiers. These are the Rate Tiers that are defined for the hotel.

In addition, Table IX includes a relevant Glossary of Terms.

TABLE IX

GLOSSARY OF TERMS

| Term | Definition |
| --- | --- |
| Target Stay | a cluster of information associated with some stay in a room. This information includes a rate plan, a date interval describing the stay dates, some room attributes, and a number of occupants. |
| Target Date | an arbitrary date within the TargetStay's date interval. This date represents the stay date involved in the rate calculation algorithm. |
| Original Rate Plan | the Rate Plan associated with the TargetStay. |
| Ultimate Rate Plan | the Rate Plan that is used to determine the base price of a room. |
| Referent Rate Plan | the Rate Plan from which some other Rate Plan derives its base price. |
| Referencing Rate Plan | a logical construct used for convenience. A Rate Plan may have a Referent Rate Plan. Rate Plan is the Referent Rate Plan's referencing Rate Plan. |
| Current Rate Plan | from the algorithm's perspective, the Rate Plan that is currently affecting the price computation. |
| Ultimate Rate Season | the appropriate Rate Season (with respect to the TargetDate) within the Ultimate Rate Plan. |
| Current Rate Season | from the algorithm's perspective, the Rate Season that is currently affecting the price computation. |

TABLE IX-continued

GLOSSARY OF TERMS

| Term | Definition |
| --- | --- |
| Current Price | the current price of some room pending adjustments. |
| Relevant Day Of Week Offset: | an offset applied to the day of week. For example, if the Target Date were a Thursday, the Current Rate Season's Thursday Offset would be the Relevant Day Of Week Offset. |
| Relevant Length Of Stay Adjustment | a Length Of Stay Adjustment that is applicable with respect to the Target Stay. This value is calculated by iterating over a Rate Season's Length Of Stay Adjustments and choosing the Length Of Stay Adjustment (if any) that applies to the length of the Target Stay. See Relevant Domain above for more information. |
| Relevant Number Of Occupants Adjustment | a Number Of Occupants Adjustment that is applicable with respect to the Target Stay. This value is calculated by iterating over a Rate Season's Number Of Occupants Adjustments and choosing the Number Of Occupants Adjustment (if any) that applies to the number of occupants defined in the Target Stay. See Relevant Domain above for more information. |
| Relevant Attribute Value Seasons: | a collection of Attribute Value Seasons. This is determined via the following steps. For each Price Determining Attribute of the Current Rate Season, first, query the Current Rate Season's Rate Container for an Attribute Value Season that is appropriate for the Price Determining Attribute and the Target Date. If an appropriate Attribute Value Season is uncovered, add it to the collection of Relevant Attribute Value Seasons. |
| Relevant Price Level Offset | the offset within a Price Level Adjustment Interval that corresponds to the Price Level of a given date. This value is determined via the following steps. First, obtain the Rate Registry of the hotel associated with the stay. Secondly, obtain the Price Level Narrowing Calendar associated with the Rate Registry. Thirdly, query the Price Level Narrowing Calendar for the Price Level corresponding to the Target Date. Fourthly, query the Price Level Adjustment Interval with the Price Level to determine the appropriate offset. This offset is referred to as the Relevant Price Level Offset. |

Algorithm for Computing Room Rate

1) The Rate Plan associated with the Target Stay shall be referred to as the Original Rate Plan.

2) The Original Rate Plan initializes an Ultimate Rate Plan.

3) If the Ultimate Rate Plan has a Referent Rate Plan, then go to step 4. Else go to step 5.

4) If Ultimate Rate Plan's Referent Rate Plan becomes the Ultimate Rate Plan. Repeat step 3.

5) The Ultimate Rate Plan uses the Target Date to discover the Ultimate Rate Season. If the Ultimate Rate Season cannot be determined, then the algorithm abruptly terminates, and no price may be calculated for this day.

6) The Ultimate Rate Season is then queried for a Base Price. This Base Price initiates the Current Price.

7) The Ultimate Rate Season initiates the value of the Current Rate Season. The Ultimate Rate Plan initiates the value of the Current Rate Plan.

8) The Current Price initiates the value of a Temporary Price.

9) The Relevant Day Of Week Offset is calculated using the Temporary Price, and applied to the Current Price.

10) The Relevant Length Of Stay Adjustment is calculated using the Temporary Price, and applied to the Current Price.

11) The Relevant Number Of Occupants Adjustment is calculated using the Temporary Price, and applied to the Current Price.

12) Each of the Relevant Attribute Value Seasons uses its Price Level Adjustment Interval to discover a Relevant Price Level Offset. This offset is calculated using the Temporary Price, and applied to the Current Price.

13) If the Current Rate Plan is not the Original Rate Plan, go to step 14. Else go to step 16.

14) The Current Rate Plan Referencing Rate Plan becomes the Current Rate Plan.

15) The Current Rate Plan uses the Target Date to discover the new Current Rate Season. If an appropriate Rate Season does not exist for the Target Date then go to step 13. Else go to step 8.

16) The Current Price now reflects the price of a room with respect to the Target Date.

XII. Yield Management Subsystem Overview

Yield Management (YM) attempts to extract the maximum possible profit from a fixed capacity. YM is the application of disciplined tactics that predict consumer behavior at the micromarket level and optimize product availability and price to maximize profitability. YM is a micromanagement tool that enables companies to turn mountains of disparate marketing data into tactical intelligence, allowing them to take advantage of the fleeting opportunities of the marketplace. In a nutshell, YM is an essential business practice that ensures companies will sell the right product to the right customer at the right time for the right price.

Simple Economic Aspects of Yield Management

In economic theory, price is the main factor used to explain the links between supply and demand for a product. The profit maximizing price of a product depends on market reactions and marginal costs. There are two key elements to price, the market side (demand) and the company side (supply). For instance, a shift in the demand curve can result in a greater revenue without a reduction in price or a potential to raise price and maintain volume. A more detailed discussion of supply and demand effects under economic theory is beyond the scope of this document, but many academic and business references are available.

Hospitality-Specific Aspects of Yield Management

Yield management can be applied to a business situation consisting of fairly fixed capacity, high fixed costs, low variable costs, time-varied demand and similar inventory units. Hotels have an essentially fixed capacity, i.e., the same number and type of rooms are for sale every day. However, there are some minor deviations from fixed capacity to consider on a daily basis such as out-of-service rooms, rooms held off market, suites of rooms which may be sold individually, etc.

It is expensive for hotels to increase their basic number of rooms, therefore they have a high fixed cost. Note that it is less expensive to seasonally vary the number of rooms by such procedures as shutting down a wing during off season, but this is not something that can be done quickly.

Hotels have low variable cost because their incremental cost to rent one more room is small, i.e., it is the cost of cleaning the room and any provided amenities. Although marketing constraints prevent selling a hotel room for slightly above the variable cost, unsold capacity still represents lost potential revenue.

When demand varies over time, hotels can only apply two basic strategies: increase price and impose constraints when demand is high and decrease price and loosen constraints when demand is low. Most hotels have many rooms which are similar to each other. Hence most of these rooms may be sold as interchangeable units.

Existing Yield Management Systems

Existing YMSs typically interface with a hotel's Property Management System (PMS) or Centralized Reservation System (CRS) to obtain up-to-date information on transient and group bookings, rates, room types and other required input data. Property history and current booking information are used to forecast future demand for transient products by day of arrival, product (room type, rate) and length of stay. These YMSs generate recommended yield actions, including recommended changes to rate availabilities, overbooking levels, length of stay restrictions or rate hurdle values. Users may review the forecast and recommended revenue actions to override the forecast if appropriate and to transmit yield actions to the PMS or CRS.

YMS Overview

The YMS incorporates a real-time, neural network system (or other form of "artificial intelligence" as appropriate) that makes yield decisions based on guest history, stay patterns, perceived business, and actual reservations (instead of reservation history). The neural network is preferably coupled to a simulator included in the YMS so that users may see how different business decisions affect their revenue and profit margins.

Technology Requirements of YMS

The YMS of the present invention is preferably implemented in Java using Gemstone/J and a distributed object technology.

YMS Architecture

The YMS of the present invention is tightly coupled with the GRTMS. Therefore the YMS has timely access to all data available to and generated by the GRTMS. The degree of integration between the GRTMS and the YMS may be selectively varied depending upon various implementation constraints. In one embodiment the YMS is batch and data mass-transfer oriented. In this mode, the YMS only recommends gross controls (stay controls, rate restrictions, etc) once or twice a day. In another embodiment, the YMS operates in realtime in concert with the GRTMS and recommends individual sell strategies on a per call basis.

In order to achieve "in concert" operation, the YMS must be optimized for the GRTMS's Attribute Inventory System (AIS) implementation of the Booking-Availability-Rate (BAR) engine. (See above).

Another essential component of the YMS architecture is the Reservation Activity Simulator (RAS). RAS serves to verify the efficacy of YMS controls, allow exploration of "what-if" scenarios, etc.

In operation the GRTMS captures and the YMS uses individual call context details. This information helps determine the current caller's location along the appropriate elasticity of demand curve, support the "in concert" operation and also improve the accuracy of the RAS emulated caller.

All YMS processing is designed and optimized for extremely high performance, otherwise the required "in concert" operation cannot be achieved.

Historical Stay Data

A particular hotel's historical stay data is primarily needed for initial demand forecasting and the emulated caller component of RAS.

Ideally, the following historical stay data for the last two years of hotel operation is available from the preexisting PMS or manual records and this data can be loaded into the YMS in some fashion: 1) reservations confirmed; 2) reservations cancelled; 3) no shows (with and without revenue); 4) stay results (actual room type, room and other revenue); 5) booking date for corresponding arrive date; 6) stay changes (early departures, stay extensions); 7) walk-ups and paid walks; 8) stay controls in effect on booking date; and 9) groups information such as tentative number, original allotment, pickup sequence, and reversion quantity and date Eventually this historical data will become more complete and accurate as the GRTMS operates over time. Allowance is made in YMS processing for inaccuracies and incompleteness of this initial historical data.

Hotel Cost of Doing Business

In order for YMS to optimize net revenue, the following historical and current managerial financial information must be input and updated in a timely manner: 1) marginal cost to rent a room (may vary by type and season); 2) marginal cost of other revenue (average); 3) opportunity cost of upgrading room types; 4) cost of walking an overbooked reservation (may vary by season); and 5) marginal profit of late walk ups.

Guest History and Profile

Ideally, the following historical guest history and profile data for the last two years of hotel operation is available from the preexisting PMS or manual records and this data can be loaded into YMS: 1) market segment (business, transient, leisure); 2) point of origin (address, state, country); 3) negotiated rate (if any); 4) rate(s) actually accepted; and 5) historical spending (other revenue).

Eventually this historical data will become more accurate as the GRTMS operates over time. Allowance is made in YMS processing for inaccuracies and incompleteness of this initial historical data.

For new guests making reservations by GRTMS, in addition to the above information at least the following additional information is preferably captured by the GRTMS: 1) market segment (business, transient leisure); 2) requested attributes; 3) mandatory attributes (if any); 4) preferred attributes/features (if any); 5) rate resistance (see reservation context capture); and 6) statistical tendencies (see reservation context capture).

New guests making reservation by GDS and other external reservation systems may have their identity hidden from the GRTMS. In this case, at least the following guest information is captured: 1) travel agent IATAN; 2) PNR tracking; 3) availability queries made; and 4) rate queries made Result Data Capture Once the GRTMS has been installed and its operation has commenced, all of the following reservation and PMS stay results data are made available to the YMS. Full reservation history data includes: 1) reservation declined (with reason); 2) reservation refused (with control/inventory); 3) reservation forced (with user ID); 4) reservation initial confirmation; 5) reservation adjustments (with reasons); 6) cancellation (with reason); 7) reinstatement (with reason); and 8) other (request, temporary, quote, waitlist). PMS stay results data includes: 1) no shows without revenue; 2) no shows with revenue; 3) early departures; 4) stay extensions; 5) rate changes during stay; 6) room type changes during stay; 7) walk ups; 8) overbooked walks (comped or not); 9) room revenue (actual); and 10) other revenue.

Reservation Context Capture

The GRTMS is preferably enhanced to automatically capture the reservation context encountered during each call session. This information may include: 1) hotel (general ROH) restricted; 2) stay dates restricted; 3) attributes requested; 4) attributes restricted; 5) attributes unavailable; 6) rates requested; 7) rates offered; 8) rate up sell indicator; 9) rates restricted; 10) rates resisted; 11) rate accepted; 12) guarantee level required; 13) guarantee provided; 14) travel agent, if any; 15) duration of call; 16) forced reservation; 17) rate (price) override; and 18) time spent in context not defined above.

Demand Forecasting

Quantitative demand forecasting can be based on an extrapolation in which it is implied that historical trends will continue. The historical information described above is required for this extrapolation. An artificial intelligence module such as artificial neural network software can used to forecast the demand curves from both the historical data and hotel operational input (such as rooms off market and external economic factors). Additionally, there are various mathematical statistical analysis techniques that can be applied to both the input and output of the demand forecast.

Recommending Gross Controls

Given a particular demand forecast, another artificial intelligence module can then recommend the specific controls to be applied per day to GRTMS. The controls to be set are at least the following: 1) stay controls on hotel (closeout, no arrival, etc); 2) guarantee level required; 3) stay controls on real attribute combinations; 4) overbooking on hotel run-of-house; 5) overbooking on real attribute combinations; 6) inventory of rate categories and/or plans; 7) stay controls on rate categories and/or plans; and 8) explain mode.

Human Oversight

A human manager, sometimes called a "Space Controller" (SC), may be "in the loop" between the GRTMS and the YMS in an oversight capacity. The SC is provided with a GUI to view/approve/change the recommended control settings. The SC GUI also preferably contains an "explain mode", wherein the recommendations from YMS are justified in detail. Any SC changes to recommended control settings are preferably logged for later reporting and analysis.

Group Evaluator

Many hotels employ a Group Reservations Manager (GRM) and/or use group booking software whose primary purpose is to sell excess hotel capacity to groups of individuals at a discounted rate who will book far ahead of arrival. However and simplistically, if on a given day the combination of group occupancy and the demand for non-discounted rooms exceeds hotel capacity then profitability will suffer because the opportunity has been lost to sell the group-occupied rooms at a higher rate.

The YMS Group Evaluator module performs at least the following functions: 1) Assess the historical impact of groups on net profit; 2) Assess historical group multi-day stay patterns and project same; 3) Recommend group allotments and pickup cutoff dates; and 4) Evaluate lost transient business due to no inventory because group allotments were not picked up in time or not reverted soon enough. The Group Evaluator GUI also includes an "Explain mode" similar to the SC GUI described above.

In Concert Operation

The YMS preferably operates in realtime in concert with the GRTMS. "In realtime concert" means that during an individual reservation call session and in response to particular conditions, the YMS provides individual sell strategies on a per call basis. This preferably takes the form of making a local (ephemeral) adjustment of one or more stay controls which would cause the GRTMS to display more or less than it otherwise would. The YMS may also make an up sell or down sell recommendation (by highlighting a certain rate, for instance) in a particular situation for a particular guest. Optionally, the YMS may be requested to explain the reasons for its stay control changes or recommendations.

Reports

The YMS also produce a variety of reports and listings available in several formats. Amongst these reports and listings are the following: 1) Demand forecast by market segment per day vs actuals; 2) All stay controls recommended/invoked per day; 3) Manual override of YMS recommendations by SC and GRM; 4) Forced reservations (over disallowed request); 5) Forced discounted price (below available prices); 6) Business lost due to stay controls; 7) Business lost due to no inventory; 8) Ditto versus group allotments (no pickup); 9) Occupancy vs overbooked vs walks vs noshows vs heldback; and 10) Net profit per day.

Reservation Activity Simulator

The YMS Reservation Activity Simulator (RAS) is an adjunct module which computer simulates GRTMS operation. Input to the simulation is captured actual or emulated guest calls and/or GDS booking requests. Several GRTMS operates normally against this input. The output is the reservation results data described above which may be evaluated against the actual reservation results data.

RAS requires that a statistically accurate caller be emulated. "Statistically accurate" in this context means that over a large number of individual reservation opportunities processed by RMS, the emulated caller will produce nearly the same output results as would a similar number of real callers. Both the reservation results data (gross effects) and reservation context capture (fine effects) are used to emulate an individual caller's desires (attributes requested, etc) and reactions (e.g., rate resistance).

RAS can be used to verify the effectiveness and profitability of pre-set controls and inventories. RAS can explore "what-if" scenarios by altering the input to reflect changes in demand. RAS can explore the consequences of human intervention such as SC override of YMS recommended stay controls or forced reservations or forced rates by supervisor voice agents. RAS can comparatively evaluate the effectiveness of other YMSs or human space controllers. Finally, RAS can show the net profitability difference between pre- and post-YMS use.

Mathematical Analysis

In addition to RAS being used to evaluate the accuracy and effectiveness of demand forecasts and stay control recommendations, conventional statistical analysis techniques may also be used. Amongst these techniques are: 1) Fourier Analysis; 2) Eigenvalue Analysis; 3) Correlation, covariance and coherence coefficient calculation; and 4) Mutual information Analysis.

CONCLUSION

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A processor-readable medium comprising code representing instructions to cause a processor to:

receive guest information from a first guest, said guest information including at least one item selected from the group of a name, a market segment, and a point of origin;

receive a room request from said first guest, said room request from said first guest including at least one item selected from the group of an arrival date, a length of stay, and at least one room attribute;

determine, based at least partially on the received guest information, a predetermined category of guests within which the first guest can be classified, the predetermined category of guests including guests having similar guest profile information;

determine, based at least partially on the received room request, a predetermined category of room from which the room request can be satisfied;

access an inventory of hotel rooms that is organized as a hierarchal combination of a plurality of attributes associated with a room;

wherein said hierarchal combination of a plurality of attributes comprises: a plurality of first attribute combinations, second attribute combinations, and third attribute combinations, wherein each said first attribute combination comprises at least one second attribute combination and each said second attribute combination comprises at least one third attribute combination;

determine whether a room satisfying said at least one room attribute in said room request is available within said inventory of rooms based on said plurality of attributes associated with said room; and determine a room rate for said first guest based on the predetermined category of guests and further based on a forecast of demand for a room from the predetermined category of room, said forecast of demand being based on historical data.

2. The processor-readable medium of claim 1, further comprising code representing instructions to cause a processor to:

receive guest information from a second guest;

receive a room request from said second guest, said room request from said second guest being similar to said room request from said first guest;

determine, based at least partially on the received guest information from the second guest, a predetermined category of guests within which the second guest can be classified, the predetermined category of guests including guests having similar guest profile information;

determine, based at least partially on the received room request from the second guest, a predetermined category of room from which the room request from the second guest can be satisfied; and determine a room rate for said second guest based on the predetermined category of guests within which the second guest can be classified and further based on a forecast of demand for a room from the predetermined category of room from which the room request from the second guest can be satisfied, said room rate for said first guest being different from said room rate for said second guest.

3. The processor-readable medium of claim 1, further comprising code representing instructions to cause a processor to:

receive guest information from a second guest, said guest information from said second guest being similar to said guest information from said first guest;

receive a room request from said second guest;

determine, based at least partially on the received guest information from the second guest, a predetermined category of guests within which the second guest can be classified, the predetermined category of guests including guests having similar guest profile information;

determine, based at least partially on the received room request from the second guest, a predetermined category of room from which the room request from the second guest can be satisfied; and determine a room rate for said second guest based on the predetermined category of guests within which the second guest can be classified and further based on a forecast of demand for a room from the predetermined category of room from which the room request from the second guest can be satisfied, said room rate for said first guest being different from said room rate for said second guest.

4. The processor-readable medium of claim 1, further comprising code representing instructions to cause a processor, before determining said room rate for said first guest, to:

organize said inventory of hotel rooms as a plurality of first attribute combinations, second attribute combinations, and third attribute combinations, wherein each said first attribute combination comprises at least one second attribute combination and each said second attribute combination comprises at least one third attribute combination;

determine a number of rooms in said inventory represented by each of said attribute combinations;

identify each attribute combination from said plurality of attribute combinations that corresponds to said at least one room attribute in said room request from said first guest; and determine whether said room request from said first guest can be met from said inventory based on a number of rooms available for each identified attribute combination.

5. The processor-readable medium of claim 4, further comprising code representing instructions to cause a processor to:

adjust said number of rooms available for each identified attribute combination if said room request from said first guest can be met from said inventory.

6. The processor-readable medium of claim 4, further comprising code representing instructions to cause a processor to:

deny said room request from said first guest if said room request from said first guest cannot be met from said inventory.

7. The processor-readable medium of claim 4, wherein said number of rooms available includes an allowed number of overbooked rooms.

8. The processor-readable medium of claim 4, wherein said number of rooms available is based on said forecast of demand.

9. The processor-readable medium of claim 4, wherein said room rate for said first guest is further based on said number of rooms available.

10. The processor-readable medium of claim 4, wherein the third attribute combination comprises more attributes than the second attribute combination, and wherein the second attribute combination comprises more attributes than the first attribute combination.

11. A system, comprising:

an interface configured to receive guest information and a room request from a first guest; and a processor in communication with the interface, the processor being configured to:

determine, based partially on received guest information, a predetermined category of guests within which the first guest can be classified, the predetermined category of guests including guests having similar guest profile information, determine, based at least partially on the room request, a predetermined category of room from which the room request can be satisfied, access an inventory of hotel rooms that is organized as a hierarchal combination of a plurality of attributes associated with a room, wherein said hierarchal combination of a plurality of attributes comprises: a plurality of first attribute combinations, second attribute combinations, and third attribute combinations, wherein each said first attribute combination comprises at least one second attribute combination and each said second attribute combination comprises at least one third attribute combination;

determine whether a room satisfying at least one room attribute in said room request is available within said inventory of rooms based on said plurality of attributes associated with said room, and determine a room rate for the first guest based on the predetermined category of guests and further based on a forecast of demand for a room from the predetermined category of room, the forecast of demand being based on historical data.

12. The system of claim 11, wherein the interface is configured to receive guest information including at least one item selected from the group of a name, a market segment, and a point of origin.

13. The system of claim 11, further comprising:

a centralized database in communication with the interface and the processor, the centralized database being configured to store and communicate to the processor the guest profile information associated with the guests having profile information similar to the first guest, the centralized database being further configured to store and communicate to the processor the historical data.

14. The system of claim 13, wherein the centralized database is configured to store information associated with a first lodging property and information associated with a second lodging property, the information associated with the first lodging property and the information associated with the second lodging property each including an inventory of rooms.

15. The system of claim 14, further comprising:
a first external database associated with the first lodging property, the first external database being configured to store inventory information associated with rooms of the first lodging property including availability information and pricing information of rooms of the first lodging property; and
a second external database associated with the second lodging property, the second external database being configured to store inventory information associated with rooms of the second lodging property including availability information and pricing information regarding each of said inventory of rooms of the second lodging property.

16. The system of claim 15, further comprising:
a reservations management system configured to communicate with the interface and the processor, the reservations management system being configured to communicate with a first reservation system and a second reservation system different from the first reservation system, the reservations management system being configured to make a reservation for a room of at least one property selected from the group of the first lodging property and the second lodging property based on the guest information, the reservations management system being further configured to update information in the centralized database associated with the reservation, and the reservations management system being further configured to update inventory information in at least one database selected from the group of the first external database and the second external database based on the reservation.

17. The system of claim 16, wherein the reservations management system is configured to query the centralized database for inventory information associated with rooms of the first lodging property and for inventory information associated with rooms of the second lodging property.

18. The system of claim 15, wherein said first external database is configured to store an inventory of hotel rooms as a hierarchal combination of a plurality of attributes associated with rooms of the first lodging property, said plurality of attributes comprising a plurality of first attribute combinations, second attribute combinations, and third attribute combinations, wherein each said first attribute combination comprises at least one second attribute combination and each said second attribute combination comprises at least one third attribute combination.

19. The system of claim 15, wherein said second external database is configured to store an inventory of hotel rooms as a hierarchal combination of a plurality of attributes associated with rooms of the second lodging property, said plurality of attributes comprising a plurality of first attribute combinations, second attribute combinations, and third attribute combinations, wherein each said first attribute combination comprises at least one second attribute combination and each said second attribute combination comprises at least one third attribute combination.

20. The system of claim 15, wherein the third attribute combination comprises more attributes than the second attribute combination, and wherein the second attribute combination comprises more attributes than the first attribute combination.

21. The system of claim 15, wherein the third attribute combination comprises more attributes than the second attribute combination, and wherein the second attribute combination comprises more attributes than the first attribute combination.

22. The system of claim 11, further comprising:
a reservations management system configured to communicate with the interface and the processor, the reservations management system being configured to communicate with a first reservation system and a second reservation system different from the first reservation system, the reservations management system being configured to make a reservation for a room of at least one property selected from the group of a first lodging property and a second lodging property based on the guest information.

23. The system of claim 22, wherein the first reservation system includes at least one item selected from the group of a global distribution system and a property management system that controls an inventory of at least one item selected from the group of a hotel and a hotel chain.

24. The system of claim 22, wherein the interface includes at least one item selected from the group of a reservation agent terminal, a direct access client, and a web server coupled to a web browser, the interface being in communication with the first reservation system.

25. The system of claim 22, wherein the reservations management system is configured to cause the processor to determine the room rate for the first guest.

26. The system of claim 22, wherein said reservations management is configured to managing yield of at least one item selected from the group of the first lodging property and the second lodging property.

27. The system of claim 22, wherein the interface is a first interface from a plurality of interfaces, the first interface being configured to communicate with the first reservation system, a second interface from the plurality of interfaces being configured to communicate with the second reservation system.

28. The system of claim 27, wherein the first interface is configured to translate information between a format associated with the reservation management system and a format associated with the first reservation system; and
wherein the second interface is configured to translate information between the format associated with the reservation management system and a format associated with said second reservation system.

29. A system, comprising:
a centralized database configured to store historical data and information associated with an inventory of rooms for a first lodging property and information associated with an inventory of rooms for a second lodging property;
a first external database in communication with the centralized database, the first external database being configured to store inventory information associated with the first lodging property, the inventory information including availability information and pricing information associated with the first lodging property;
a second external database in communication with the centralized database, the second external database being configured to store inventory information associated with the second lodging property, the inventory information including availability information and pricing information associated with the second lodging property; and
a reservations management system in communication with the centralized database and at least one database selected from the group of the first external database and the second external database, the reservations management system being configured to:
determine, based at least partially on guest information for a guest, a predetermined category of guests within which the guest can be classified, the predetermined category of guests including guests having similar guest profile information,
determine, based at least partially on a room request made by the guest, a predetermined category of room from which the room request can be satisfied,
access an inventory of hotel rooms that is organized as a hierarchal combination of a plurality of attributes associated with a room,
wherein said hierarchal combination of a plurality of attributes comprises: a plurality of first attribute combinations, second attribute combinations, and third attribute combinations, wherein each said first attribute combination comprises at least one second attribute combination and each said second attribute combination comprises at least one third attribute combination;
determine whether a room satisfying at least one room attribute in said room request is available within said inventory of rooms based on said plurality of attributes associated with said room, and
determine a room rate for the guest based on the predetermined category of guests a forecast of demand for a room from the predetermined category of room, the forecast of demand being based on historical data received from the centralized database.

30. The system of claim 29, wherein said first external database is configured to store an inventory of hotel rooms as a hierarchal combination of a plurality of attributes associated with rooms of the first lodging property, said plurality of attributes comprising a plurality of first attribute combinations, second attribute combinations, and third attribute combinations, wherein each said first attribute combination comprises at least one second attribute combination and each said second attribute combination comprises at least one third attribute combination.

31. The system of claim 29, wherein said second external database is configured to store an inventory of hotel rooms as a hierarchal combination of a plurality of attributes associated with rooms of the second lodging property, said plurality of attributes comprising a plurality of first attribute combinations, second attribute combinations, and third attribute combinations, wherein each said first attribute combination comprises at least one second attribute combination and each said second attribute combination comprises at least one third attribute combination.

32. The system of claim 29, wherein the third attribute combination comprises more attributes than the second attribute combination, and wherein the second attribute combination comprises more attributes than the first attribute combination.

33. The system of claim 29, wherein the third attribute combination comprises more attributes than the second attribute combination, and wherein the second attribute combination comprises more attributes than the first attribute combination.

* * * * *